United States Patent
Jia et al.

(10) Patent No.: US 10,994,749 B2
(45) Date of Patent: May 4, 2021

(54) VEHICLE CONTROL METHOD, RELATED DEVICE, AND COMPUTER STORAGE MEDIUM

(71) Applicant: Huawei Technologies Co., Ltd., Shenzhen (CN)

(72) Inventors: Xiaolin Jia, Hangzhou (CN); Huawei Liu, Shenzhen (CN); Baifeng Yu, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/028,379

(22) Filed: Sep. 22, 2020

(65) Prior Publication Data

US 2021/0001886 A1    Jan. 7, 2021

Related U.S. Application Data

(63) Continuation of application No. PCT/CN2018/124086, filed on Dec. 26, 2018.

(51) Int. Cl.
*B60W 50/02* (2012.01)
*B60W 60/00* (2020.01)
*B60W 30/095* (2012.01)

(52) U.S. Cl.
CPC .... *B60W 60/0015* (2020.02); *B60W 30/0956* (2013.01); *B60W 50/0205* (2013.01); *B60W 2555/00* (2020.02)

(58) Field of Classification Search
CPC ............. B60W 50/02; B60W 50/0205; B60W 50/021; B60W 50/0225; B60W 50/023; B60W 50/029; B60W 50/0292; B60W 60/00; B60W 60/001; B60W 60/0015
See application file for complete search history.

(56) References Cited

U.S. PATENT DOCUMENTS

| | | | |
|---|---|---|---|
| 2016/0103450 A1 | 4/2016 | Hogenmueller et al. | |
| 2018/0089493 A1* | 3/2018 | Nirenberg | G06K 9/00369 |
| 2018/0107212 A1 | 4/2018 | Baumgaertner | |
| 2019/0113916 A1* | 4/2019 | Guo | B60W 60/0015 |
| 2019/0138000 A1* | 5/2019 | Hammond | B60W 50/0205 |
| 2019/0300009 A1* | 10/2019 | Sakamoto | B60W 50/0225 |

(Continued)

FOREIGN PATENT DOCUMENTS

| | | |
|---|---|---|
| CN | 104290745 A | 1/2015 |
| CN | 107571868 A | 1/2018 |

(Continued)

*Primary Examiner* — Anshul Sood
(74) *Attorney, Agent, or Firm* — Conley Rose, P.C.

(57) ABSTRACT

A vehicle control method comprising: obtaining first vehicle data and second vehicle data, processing the first vehicle data using the first computing system to obtain first structured data; processing the second vehicle data using the second computing system to obtain second structured data; and further controlling safe driving of a vehicle based on the first structured data and the second structured data, wherein the first structured data is used to represent an environment that is of the vehicle at a first time point and that is detected by the first group sensing apparatus, and the second structured data is used to represent an environment that is of the vehicle at the first time point and that is detected by the second group sensing apparatus.

20 Claims, 12 Drawing Sheets

(56) References Cited

U.S. PATENT DOCUMENTS

| | | | |
|---|---|---|---|
| 2020/0130704 A1* | 4/2020 | Viswanathan | B60W 50/0205 |
| 2020/0182626 A1* | 6/2020 | He | G01S 17/89 |
| 2020/0201323 A1* | 6/2020 | Park | B60W 60/0015 |
| 2020/0201324 A1* | 6/2020 | Darayan | B60W 50/0205 |

FOREIGN PATENT DOCUMENTS

| | | |
|---|---|---|
| CN | 107953890 A | 4/2018 |
| CN | 108776472 A | 11/2018 |
| CN | 108860142 A | 11/2018 |
| CN | 208165094 U | 11/2018 |
| CN | 109032132 A | 12/2018 |
| DE | 102007041121 A1 | 3/2009 |
| EP | 3363698 A1 | 8/2018 |
| WO | 2017167820 A1 | 10/2017 |

* cited by examiner

VEHICLE CONTROL METHOD, RELATED DEVICE, AND COMPUTER STORAGE MEDIUM

CROSS-REFERENCE TO RELATED APPLICATIONS

This application is a continuation of International Patent Application No. PCT/CN2018/124086, filed on Dec. 26, 2018, the disclosure of which is hereby incorporated by reference in its entirety.

TECHNICAL FIELD

The present disclosure relates to the field of vehicle technologies, and in particular, to a vehicle control method, a related device, and a computer storage medium.

BACKGROUND

In recent years, with continuous development of artificial intelligence technologies, an autonomous driving technology for vehicles develops rapidly. Safe driving of an autonomous vehicle depends on collection and analysis of a large amount of sensor data, to avoid another vehicle, a pedestrian, or the like on a road.

Currently, to resolve a driving safety problem of an autonomous vehicle, two computing systems are designed in an existing vehicle, to process a large amount of sensor data. When any one of the two computing systems is faulty, the autonomous vehicle does not stop running, and the other computing system that is not faulty may be used to process the sensor data, to control safe driving of the vehicle. Therefore, this effectively ensures driving safety of the autonomous vehicle.

However, it is found in practice that, in the foregoing data processing solution based on the two computing systems, the two computing systems designed in the vehicle are in a complete redundancy relationship. To be more specific, each computing system needs to process sensor data collected by all sensing apparatuses. In other words, when neither of the two computing systems is faulty, same sensor data needs to be processed twice using the two computing systems. This increases power consumption of the vehicle and a computing power requirement, and cannot meet requirements of vehicle mass production for low power consumption and high computing power.

SUMMARY

Embodiments of the present disclosure provide a vehicle control method, a related device, and a computer storage medium, to resolve technical problems in other approaches that requirements of mass production for low power consumption and high computing power cannot be met.

According to a first aspect, an embodiment of the present disclosure discloses a vehicle control method, applied to a computing device including a first computing system and a second computing system. The method includes: obtaining first vehicle data and second vehicle data; processing the first vehicle data using the first computing system to obtain first structured data; processing the second vehicle data using the second computing system to obtain second structured data; and controlling safe driving of a vehicle based on the first structured data and the second structured data. The first vehicle data is environment data that is within a first sensing scope and that is detected by a first group sensing apparatus at a first time point, the second vehicle data is environment data that is within a second sensing scope and that is detected by a second group sensing apparatus at a second time point, the first structured data is used to represent an environment that is of a vehicle at the first time point and that is detected by the first group sensing apparatus, and the second structured data is used to represent an environment that is of the vehicle at the second time point and that is detected by the second group sensing apparatus.

Implementation of this embodiment of the present disclosure can resolve problems in other approaches that requirements of mass production for low power consumption and high computing power cannot be met.

With reference to the first aspect, in a first possible implementation of the first aspect, a difference between a data volume of the first vehicle data and a data volume of the second vehicle data is less than or equal to a first threshold. For example, the computing device allocates, using a data volume balancing rule, vehicle data that needs to be processed by a computing system. A data volume of the vehicle data that needs to be processed by the computing system is in direct proportion to computing power required to process the vehicle data. A larger data volume of the vehicle data indicates higher computing power required by the computing system to process the vehicle data. On the contrary, a smaller data volume of the vehicle data indicates lower computing power required by the computing system to process the vehicle data. When the computing device balances computing power, a difference between computing power required by the first computing system to process the first vehicle data and computing power required by the second computing system to process the second vehicle data needs to be less than or equal to a second threshold. The second threshold is defined by a system, for example, it is an empirical value that is set based on user experience.

With reference to the first aspect or the first possible implementation of the first aspect, in a second possible implementation of the first aspect, each group sensing apparatus needs to have a global control capability. For example, in the present disclosure, the first group sensing apparatus and the second group sensing apparatus each include at least one sensing apparatus deployed in each subarea. The subarea herein may refer to a preset direction. In other words, each group sensing apparatus may include a sensing apparatus deployed in each direction, such that each group sensing apparatus can collect panorama data in a current environment. The panorama data is data obtained by detecting a panorama (a 360-degree visible scope) of the current environment by the group sensing apparatus. In other words, the first sensing scope corresponding to the first group sensing apparatus and the second sensing scope corresponding to the second group sensing apparatus each may be a 360-degree panoramic visual scope.

With reference to the first aspect, and the first or the second possible implementation of the first aspect, in a third possible implementation of the first aspect, when neither the first computing system nor the second computing system is faulty, the computing device may control safe driving of the vehicle using the first computing system. Alternatively, when the first computing system is a primary computing system, the second computing system is a secondary computing system, and none of the two computing systems is faulty, the computing device may control safe driving of the vehicle using the first computing system. For example, the computing device obtains a first control instruction based on the first structured data and the second structured data using the first computing system, to further control safe driving of the vehicle according to the first control instruction.

With reference to any one of the first aspect, or the first to the third possible implementations of the first aspect, in a fourth possible implementation of the first aspect, when any computing system in the computing device is faulty after the structured data is obtained, the computing device may control safe driving of the vehicle using the other computing system that is not faulty. For example, after the first computing system obtains the first structured data, a fault occurs in the first computing system. The computing device determines that the first computing system is faulty, and may obtain, in response to the fault, a second control instruction based on the first structured data and the second structured data using the second computing system. Then, the computing device controls safe driving of the vehicle according to the second control instruction.

With reference to any one of the first aspect, or the first to the third possible implementations of the first aspect, in a fifth possible implementation of the first aspect, when any computing system in the computing device is faulty before the structured data is obtained, the computing device may process the obtained vehicle data using the other computing system that is not faulty, to control safe driving of the vehicle. For example, the first computing system is faulty. The computing device may obtain third vehicle data and fourth vehicle data. After obtaining the third vehicle data and the fourth vehicle data, the computing device determines that the first computing system is faulty, and performs, in response to the determining, dimension reduction processing on the third vehicle data and the fourth vehicle data using the second computing system. The third vehicle data is environment data that is within the first sensing scope and that is detected by the first group sensing apparatus at a second time point, and the fourth vehicle data is environment data that is within the second sensing scope and that is detected by the second group sensing apparatus at the second time point. Further, the computing device processes the third vehicle data after dimension reduction and the fourth vehicle data after dimension reduction using the second computing system, to obtain corresponding third structured data and fourth structured data. The third structured data is used to represent an environment that is of the vehicle at the second time point and that is detected by the first group sensing apparatus, and the fourth structured data is used to represent an environment that is of the vehicle at the second time point and that is detected by the second group sensing apparatus. Correspondingly, the computing device may control safe driving of the vehicle based on the third structured data and fourth structured data.

With reference to any one of the first aspect, or the first to the third possible implementations of the first aspect, in a sixth possible implementation of the first aspect, after any computing system in the computing device is faulty, the other computing system that is not faulty cannot obtain vehicle data that needs to be processed by the computing system that is faulty. For example, the first computing system is faulty. The second computing system cannot obtain the third vehicle data that needs to be processed by the first computing system. Therefore, the computing device may obtain the fourth vehicle data using the second computing system, and perform dimension reduction on the fourth vehicle data. Further, the second computing system processes the fourth vehicle data after dimension reduction, to obtain the fourth structured data, and obtains a corresponding control instruction based on the fourth structured data. Further, the computing device controls safe driving of the vehicle according to the control instruction using a microcontroller unit.

With reference to any one of the first aspect, or the first to the third possible implementations of the first aspect, in a seventh possible implementation of the first aspect, after any computing system in the computing device is faulty, the other computing system that is not faulty cannot obtain vehicle data that needs to be processed by the two computing systems. For example, the first computing system is faulty. The second computing system cannot obtain the third vehicle data and the fourth vehicle data. Therefore, the computing device may process pre-stored vehicle data using the second computing system, to obtain a corresponding control instruction. Alternatively, the computing device may obtain a pre-stored control instruction. Further, the computing device controls safe driving of the vehicle according to the control instruction. For example, the control instruction may be used to control the vehicle to decelerate and pull over.

According to a second aspect, an embodiment of the present disclosure provides a computing device. The device includes a functional module or a unit configured to perform the method described in any one of the first aspect or the possible implementations of the first aspect.

According to a third aspect, an embodiment of the present disclosure provides a computing device, including a processor, a memory, a communications interface, and a bus. The processor, the communications interface, and the memory communicate with each other using the bus. The communications interface is configured to receive and send data. The memory is configured to store an instruction. The processor is configured to invoke the instruction in the memory, to perform the method in any one of the first aspect or the possible implementations of the first aspect.

According to a fourth aspect, an embodiment of the present disclosure provides a communications system, including a first computing system, a second computing system, and a microcontroller unit.

The first computing system is configured to obtain first vehicle data, and process the first vehicle data, to obtain first structured data, where the first vehicle data is environment data that is within a first sensing scope and that is detected by a first group sensing apparatus at a first time point. Additionally, the first structured data is used to represent an environment that is of a vehicle at the first time point and that is detected by the first group sensing apparatus.

The second computing system is configured to obtain second vehicle data, and process the second vehicle data, to obtain second structured data, where the second vehicle data is environment data that is within a second sensing scope and that is detected by a second group sensing apparatus at the first time point. Additionally, the second structured data is used to represent an environment that is of the vehicle at the first time point and that is detected by the second group sensing apparatus.

The first computing system is further configured to obtain a first control instruction based on the first structured data and the second structured data.

The microcontroller unit is configured to control safe driving of the vehicle according to the first control instruction.

For a part that is not shown or not described in this embodiment of the present disclosure, refer to related content in the first aspect. Details are not described herein again.

According to a fifth aspect, a computer non-transitory storage medium is provided. The computer non-transitory storage medium stores program code used for packet processing. The program code includes an instruction used to perform the method in any one of the first aspect or the possible implementations of the first aspect.

According to a sixth aspect, a chip product is provided, to perform the method in any one of the first aspect or the possible implementations of the first aspect.

Based on the implementations provided in the foregoing aspects, in the present disclosure, the implementations may be further combined to provide more implementations.

BRIEF DESCRIPTION OF DRAWINGS

To describe the technical solutions in the embodiments of the present disclosure or in other approaches more clearly, the following briefly describes the accompanying drawings required for describing the embodiments or other approaches.

DESCRIPTION OF EMBODIMENTS

The following describes the embodiments of the present disclosure with reference to the accompanying drawings.

Some concepts or technical terms in the present disclosure are first described.

Structured data, also referred to as row data, is data logically expressed and implemented using a two-dimensional table structure. The structured data strictly follows a specific data format and a specific data length specification, to better present result data. Image data is used as an example. A computing device may convert the image data into corresponding structured data. The structured data can better present detection objects included in an image, for example, a vehicle and a person.

Dimension reduction is a processing manner in which a data volume is reduced, and a concept of low dimensionality is analogous to a concept of high dimensionality. For example, a computing device converts a high-dimensional graph into a low-dimensional graph, and further processes the low-dimensional graph, to reduce a computing volume of the graph. In the present disclosure, a processing manner used in dimension reduction includes but is not limited to frame rate reduction, reduction of a quantity of received sensing apparatuses (sensor quantity reduction for short), resolution reduction, and the like. Details are described in detail below in the present disclosure.

Computing power is a computing capability of a computing device during data processing, and is used to measure a value of a data processing capability of the computing device. A data volume of sensor data that needs to be processed by the computing device is in direct proportion to computing power required by the computing device to process the sensor data. A larger data volume of the sensor data indicates higher computing power required by the computing device to process the sensor data. On the contrary, a smaller data volume of the sensor data indicates lower computing power required by the computing device to process the sensor data. This is not limited in the present disclosure.

Figure 1A:
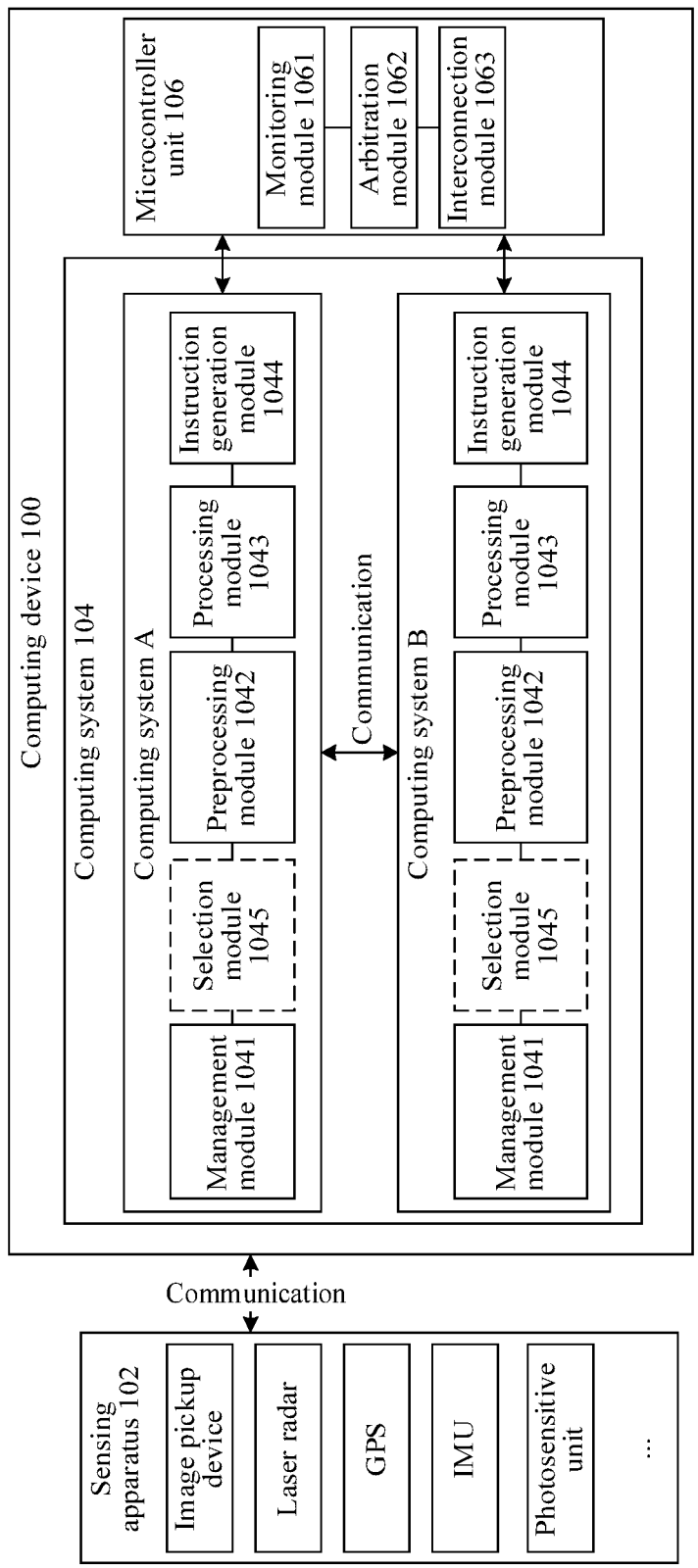
FIG. 1A, FIG. 1B, and FIG. 1C are schematic diagrams of frameworks of two computing devices according to an embodiment of the present disclosure.

In addition, to resolve problems, in an existing data processing solution based on two computing systems, that requirements of vehicle mass production for low power consumption and high computing power cannot be met, the present disclosure provides another vehicle control method based on two computing systems, a network framework applicable to the method, and a related device. FIG. 1A is a schematic diagram of a framework of a computing device according to an embodiment of the present disclosure. The computing device 100 shown in FIG. 1A includes a sensing apparatus 102, a computing system 104, and a microcontroller unit (MCU) 106. The computing system 104 may separately communicate with the sensing apparatus 102 and the microcontroller unit 106 using a network. In addition, quantities of the sensing apparatuses 102, the computing systems 104, and the microcontroller units 106 are not limited. Optionally, the quantity of the microcontroller unit 106 is less than or equal to the quantity of the computing system 104. In other words, each computing system may correspondingly communicate with one microcontroller unit, and one microcontroller unit may correspondingly communicate with one or more computing systems. As shown in FIG. 1A, two computing systems including a first computing system and a second computing system (shown as a computing system A and a computing system B) and one microcontroller unit are used as an example in the present disclosure.

Figure 2A:
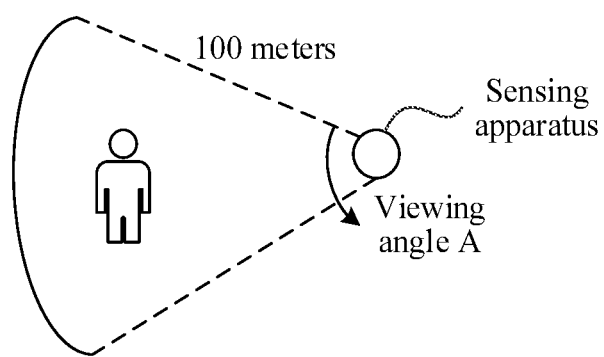
FIG. 2A is a schematic diagram of a sensing apparatus detection scenario according to an embodiment of the present disclosure.

The sensing apparatus 102 is configured to detect an environment within a preset sensing scope, to collect corresponding sensor data. When the sensing apparatus 102 is configured to collect related data of an environment of a vehicle, the sensor data collected by the sensing apparatus 102 may also be referred to as vehicle data. The preset sensing scope may be defined by a system, and is limited by hardware of the sensing apparatus. FIG. 2A is a schematic diagram of a sensing scope of a sensing apparatus. As shown in FIG. 2A, the sensing scope that can be detected by the sensing apparatus is an area covered using the sensing apparatus as an origin, a detection distance of 100 meters as a radius, and a radian of a viewing angle A.

Figure 2B:
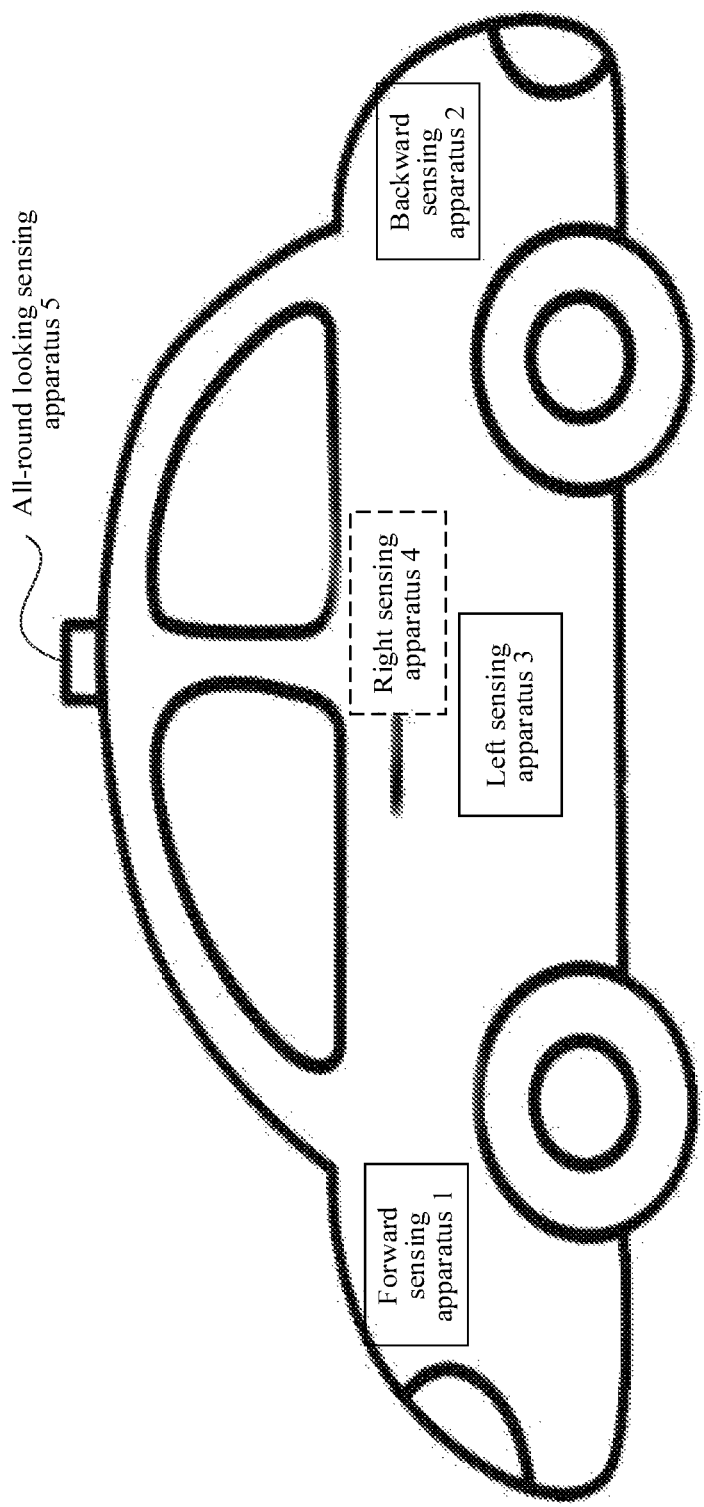
FIG. 2B is a schematic diagram of a sensing apparatus deployment scenario according to an embodiment of the present disclosure.

The sensing apparatus 102 may be deployed inside or outside the computing device 100, for example, deployed in another device other than the computing device 100. As shown in FIG. 1A, this embodiment of the present disclosure is shown using an example in which the sensing apparatus 102 is deployed in the other device other than the computing device 100. However, a deployment position and a deployment angle of the sensing apparatus 102 in the other device are not limited in the present disclosure. For example, FIG. 2B is a schematic diagram of a sensing apparatus deployment scenario. As shown in FIG. 2B, for example, a device is a vehicle, and the sensing apparatus 102 may be deployed in the front of the vehicle, for example, a forward sensing apparatus 1 shown in the figure. Alternatively, the sensing apparatus 102 may be deployed at the back of the vehicle, for example, a backward sensing apparatus 2 shown in the figure. Alternatively, the sensing apparatus 102 may be deployed at a left side of the vehicle, for example, a left sensing apparatus 3 shown in the figure. Alternatively, the sensing apparatus 102 may be deployed at a right side of the vehicle, for example, a right sensing apparatus 4 shown in the figure. Alternatively, the sensing apparatus 102 may be deployed at the top of a sunroof of the vehicle, and is used as an all-round looking sensing apparatus, for example, a sensing apparatus 5 shown in the figure, or the like. This is not limited in this embodiment of the present disclosure.

In actual application, the sensing apparatus 102 may be deployed in different subareas in a device. A quantity of subareas is not limited in the present disclosure, and there may be one or more subareas. Generally, there are at least two subareas. The subarea in the present disclosure may refer to a direction, and the subarea may be defined by a system. For example, a device is a vehicle. To obtain panorama data of an environment of the vehicle, a system may deploy a sensing apparatus cluster in four subareas, and the subareas may be divided based on a direction of the vehicle, for example, a forward subarea, a backward subarea, a left subarea, and a right subarea of the vehicle. A sensing apparatus deployed in the forward subarea may also be referred to as a forward sensing apparatus, a sensing apparatus deployed in the backward subarea may also be referred to as a backward sensing apparatus, a sensing apparatus deployed in the left subarea may also be referred to as a left sensing apparatus, and a sensing apparatus deployed in the right subarea may also be referred to as a right sensing apparatus. In actual application, the sensing apparatus 102 may include but is not limited to an image pickup device (for example, a camera lens or a camera), a global positioning system (GPS), a laser radar sensor, a photosensitive sensing unit, an inertial measurement unit (IMU), a temperature sensor, a barometric pressure sensor, another sensor used for environment measurement, or the like.

In the present disclosure, the sensor data collected by the sensing apparatus 102 varies with a type of the sensing apparatus 102. For example, when the sensing apparatus 102 is an image pickup device, the image pickup device includes but is not limited to a camera lens, a camera, a camera module, and the like, sensor data collected by the image pickup device may be image data. For another example, when the sensing apparatus 102 is a laser radar sensor, sensor data collected by the laser radar sensor may be laser point cloud data. For example, the laser point cloud data is point cloud data obtained by scanning a target object using the laser radar sensor. The point cloud data is recorded in a form of a point. Each point includes three-dimensional coordinates, and in addition to indicate a geometric position of the point, the three-dimensional coordinates may include depth information and the like. This is not limited in the present disclosure.

In an optional embodiment, the sensing apparatus 102 may communicate with the computing system 104 using a wired communications technology or a wireless communications technology. The wired communications technology may mean that two devices communicate with each other using a network cable, an optical fiber, or the like. The wireless communications technology includes but is not limited to a Global System for Mobile Communications (GSM), a General Packet Radio Service (GPRS), code-division multiple access (CDMA), wideband CDMA (WCDMA), time-division synchronous CDMA (TD-SCDMA), Long-Term Evolution (LTE), wireless local area network (WLAN) (for example, a Wi-Fi network), Bluetooth (BT), global navigation satellite system (GNSS), frequency modulation (FM), near-field communication (NFC), infrared (IR), and the like.

The computing system 104 is configured to process sensor data collected by a group sensing apparatus that communicates with the computing system 104. Details about how to implement data processing are described below in the present disclosure. The group sensing apparatus herein includes one or more sensing apparatuses 102, sensor data collected by each group sensing apparatus is correspondingly processed by one computing system, and one computing system may correspondingly process sensor data collected by one or more group sensing apparatuses. This is not limited in the present disclosure. It may be understood that, to ensure integrity or comprehensiveness of the sensor data, each group sensing apparatus needs to collect panorama data in a current environment, and therefore each group sensing apparatus needs to include at least one sensing apparatus in each subarea. For example, each group sensing apparatus includes a forward sensing apparatus, a backward sensing apparatus, a left sensing apparatus, a right sensing apparatus, an all-round looking sensing apparatus, and the like.

A quantity of the computing systems 104 is not limited, and there may be one or more computing systems. When there are a plurality of computing systems 104, a sensing apparatus included in a group sensing apparatus corresponding to each computing system 104 may be the same or different. Correspondingly, sensor data that is collected by a group sensing apparatus and that needs to be correspondingly processed by each computing system 104 may also be the same or different. Optionally, when sensor data that needs to be processed by any two computing systems 104 is different, to ensure integrity of the data and reliability of data management, any two computing systems may exchange intermediate data generated during data processing or result data generated after data processing. This is not limited in the present disclosure. For example, in the following description of the present disclosure, computing systems include a first computing system and a second computing system. The first computing system and the second computing system may exchange structured data and other data that are obtained by separately processing sensor data collected by a group sensing apparatus. This is described in detail below in the present disclosure.

In actual application, the computing system 104 is configured to process sensor data collected by a group sensing apparatus that communicates with the computing system 104. The group sensing apparatus may include, but is not limited to, a graphics processing unit (GPU), a video card, a field-programmable gate array (FPGA) and a central processing unit (CPU), or other devices used for data processing.

In an optional embodiment, the following describes some structures in the computing system 104. As shown in FIG. 1A, the computing system 104 (which may be the computing system A or the computing system B shown in FIG. 1A) may include a management module 1041, a preprocessing module 1042, a processing module 1043, and an instruction generation module 1044. Optionally, the computing system 104 further includes a selection module 1045.

The management module 1041 is configured to manage data related to the computing system 104. For example, the management module 1041 may be responsible for storing sensor data that is collected by a group sensing apparatus and that is received by the computing system 104, and regularly detecting the stored sensor data, for example, deleting sensor data whose storage duration exceeds preset duration, in other words, periodically clearing expired data. The preset duration is a longest buffer time of data, and may be defined by a system, for example, the preset duration is an empirical value set based on user experience.

The preprocessing module 1042 is configured to preprocess sensor data that needs to be processed by the computing system 104. The preprocessing includes but is not limited to data conversion, data screening (for example, removal of abnormal data), data encoding, data decoding, data correction, and the like. For example, the sensor data is image data. The preprocessing may be operation processing such as image scaling, image correction, or image stitching. This is not limited in the present disclosure.

The processing module 1043 is configured to process the preprocessed sensor data, to obtain structured data. For example, the processing module 1043 may perform calculation of a specified algorithm rule, such as a vector or a scalar, on the preprocessed sensor data, to detect and track a target object and therefore obtain corresponding structured data. For example, the target object is a traffic light. The structured data includes but is not limited to information such as a quantity of traffic lights in a driving environment of a vehicle, a distance between the vehicle and the traffic light, and duration in which the traffic light allows the vehicle to pass.

The instruction generation module 1044 is configured to process the structured data to control safe driving of the vehicle. For example, the instruction generation module 1044 may generate a corresponding control instruction based on the structured data obtained by the processing module 1043 by means of processing, and optionally, also based on information such as structured data obtained by another computing system 104 by means of processing, and vehicle positioning information. Further, safe driving of the vehicle is controlled according to the control instruction. For example, in FIG. 1A, to ensure data integrity or vehicle control security, the processing module 1043 in the computing system A and the processing module 1043 in the computing system B may exchange structured data obtained by means of respective processing, such that the instruction generation module 1044 in the computing system A or the computing system B can subsequently implement safety control of the vehicle based on the structured data obtained by the two computing systems by means of respective processing. Details are described below in the present disclosure.

Optionally, the computing system 104 may further include the selection module 1045. The selection module 1045 is configured to screen sensor data that is collected by at least one sensing apparatus and that is received by the computing system 104, to determine sensor data that is collected by a group sensing apparatus and that needs to be processed by the computing system 104. For example, the selection module 1045 may select, according to a computing power balancing rule or a data volume balancing rule, a group sensing apparatus that needs to be processed by the computing system 104 from a plurality of sensing apparatuses that are communicatively connected to the computing system 104, to further process sensor data collected by the group sensing apparatus. If there are a plurality of computing systems, the computing device may ensure that computing power (or a data volume) of sensor data that is of a group sensing apparatus and that needs to be processed by each computing system is roughly the same.

The computing power is used to measure a value of a data processing capability. A higher computing power indicates that a stronger or greater data processing capability is supported. On the contrary, a lower computing power indicates that a weaker data processing capability is supported. Understandably, the data volume of the sensor data is in direct proportion to the computing power required for processing the sensor data. When the data volume of the sensor data that needs to be processed by the computing system 104 (or the computing device) is larger, the computing power required is higher. On the contrary, when the data volume of the sensor data that needs to be processed by the computing system 104 (or the computing device) is smaller, the computing power required is lower. Related content is described below in the present disclosure using the data volume as an example. Correspondingly, related descriptions of the data volume are also applicable to descriptions of the computing power, and are not limited herein.

It should be noted that the computing system 104 shown in FIG. 1A may include more or fewer components in actual application, and FIG. 1A is only an example and constitutes no limitation. This is not limited in the present disclosure.

The microcontroller unit 106 is configured to control implementation of a corresponding management operation based on a processing result of the computing system 104. For example, in the field of vehicle autonomous driving, the microcontroller unit 106 may control safe driving of the vehicle based on the processing result of the computing system 104.

When there are a plurality of computing systems 104, the microcontroller unit 106 may monitor a running status of each computing system 104, to control safe driving of the vehicle based on the running status and a processing result of each computing system 104. The running status is used to indicate a running condition of a computing system, for example, normal or faulty. The running status includes a health state and a fault state. For example, the microcontroller unit 104 may control safe driving of the vehicle using a processing result of a computing system 104 whose running status is a health state. Details are described below in the present disclosure.

The microcontroller unit 106 may obtain the running status of the computing system 104 by monitoring software or hardware deployed in the computing device. The software deployed in the computing device includes but is not limited to application software customized and installed by a user, or system software deployed in the computing device, for example, an operating system (OS). Using monitoring software as an example, when detecting that a program such as a key thread (for example, a data processing related thread) or system basic software during running of the computing system is suspended, the microcontroller unit may report a fault notification message in real time or periodically, to notify that the computing system has a critical fault. Correspondingly, when receiving the fault notification message, the computing device may determine that the running status of the computing system is a fault state; otherwise, the computing device determines that the running status of the computing system is a health state. Optionally, to prevent message false reporting and improve precision of data processing, the computing device may further determine the running status of the computing system based on a quantity of times that the computing device receives the fault notification message. For example, when the quantity of times that the computing device receives the fault notification message is greater than or equal to a preset quantity of times, it may be determined that the running status of the computing system is a fault state. The preset quantity of times is defined by a system, for example, customized based on a user requirement or a preference. When the quantity of times that the computing device receives the fault notification message is less than the preset quantity of times, it may be considered that the fault notification message is falsely triggered and reported, and the running status of the computing system may be a health state.

Using monitoring hardware as an example, the computing device may monitor, in real time or periodically, whether hardware related to the computing system is faulty. For example, when hardware, such as a key interface (for example, a communications interface), a power supply, and a clock that are deployed in the computing system, is faulty, the computing system may automatically report a fault notification message to notify that the computing system is faulty. Correspondingly, after receiving the fault notification message, the computing device may determine that the computing system is faulty; otherwise, the computing device determines that the computing system is not faulty. Optionally, to avoid false reporting, the computing device may further determine the running status of the computing system by considering a quantity of times of that the computing device receives the fault notification message. For details, refer to related descriptions in the foregoing embodiment. Details are not described herein again. Optionally, when a critical fault occurs in some hardware of the computing system, the fault notification message cannot be reported. In this case, the computing device may determine the running status of the computing system based on a time interval between a current time of the system and a time at which a heartbeat packet sent by hardware is received last time. For example, when the time interval is greater than or equal to preset duration, the computing device may determine that the running status of the computing system is a fault state; otherwise, the computing device determines that the running status of the computing system is a health state, and the like.

Optionally, the microcontroller unit 106 and the computing system 104 may exchange heartbeat packets (namely, heartbeat messages) to detect a running status of the computing system 104. The heartbeat message is a message sent by a sender to a receiver, and the receiver may determine, based on the message, whether and when the sender is faulty or terminated. Generally, the heartbeat message starts to be sent when the sender starts, until the sender is powered off and stops running. In this period, the sender sends a message to the receiver periodically or in real time. If the receiver does not receive a message within a message receiving period, the receiver may consider that the sender is faulty or currently unavailable. Optionally, after receiving a message sent by the sender, the receiver may feed back a corresponding response message to the sender. The sender may determine, based on the response message, whether the receiver is faulty.

In this embodiment of the present disclosure, the computing system 104 may send a heartbeat message in real time or periodically to the microcontroller unit 106 that communicates with the computing system 104. Correspondingly, when the microcontroller unit 106 detects that no heartbeat message sent by the computing system 104 is received within a message receiving period, it may be determined that the computing system 104 is faulty, in other words, the running status of the computing system 104 is a fault state. Otherwise, it is determined that the running status of the computing system 104 is a health state.

Alternatively, the microcontroller unit 106 may actively send a heartbeat message to the computing system 104 that communicates with the microcontroller unit 106. Correspondingly, after the microcontroller unit 106 receives a response message sent by the computing system 104, it may be determined that the running status of the computing system 104 is a health state, in other words, the computing system 104 is not faulty. On the contrary, when the microcontroller unit 106 does not receive the response message sent by the computing system 104, it may be determined that the running status of the computing system 104 is a fault state, in other words, the computing system 104 is faulty.

In actual application, there may be one or more microcontroller units 106. When there is one microcontroller unit 106, the microcontroller unit 106 is configured to manage all the computing systems 104, to implement a corresponding device management operation. As shown in FIG. 1A, one microcontroller unit communicates with two computing systems, and is configured to manage processing results of the two computing systems, to implement a corresponding device management operation.

Figure 1B:
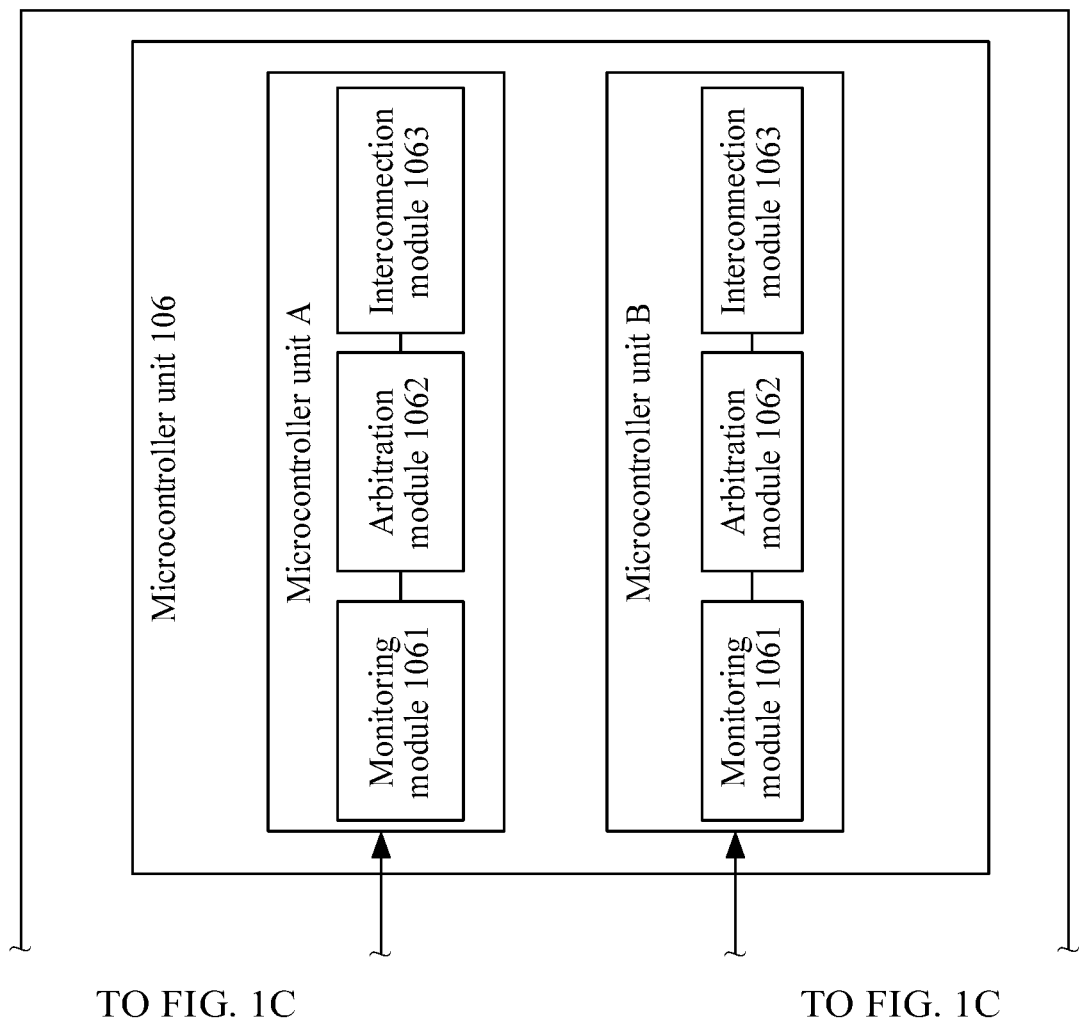
Figure 1C:
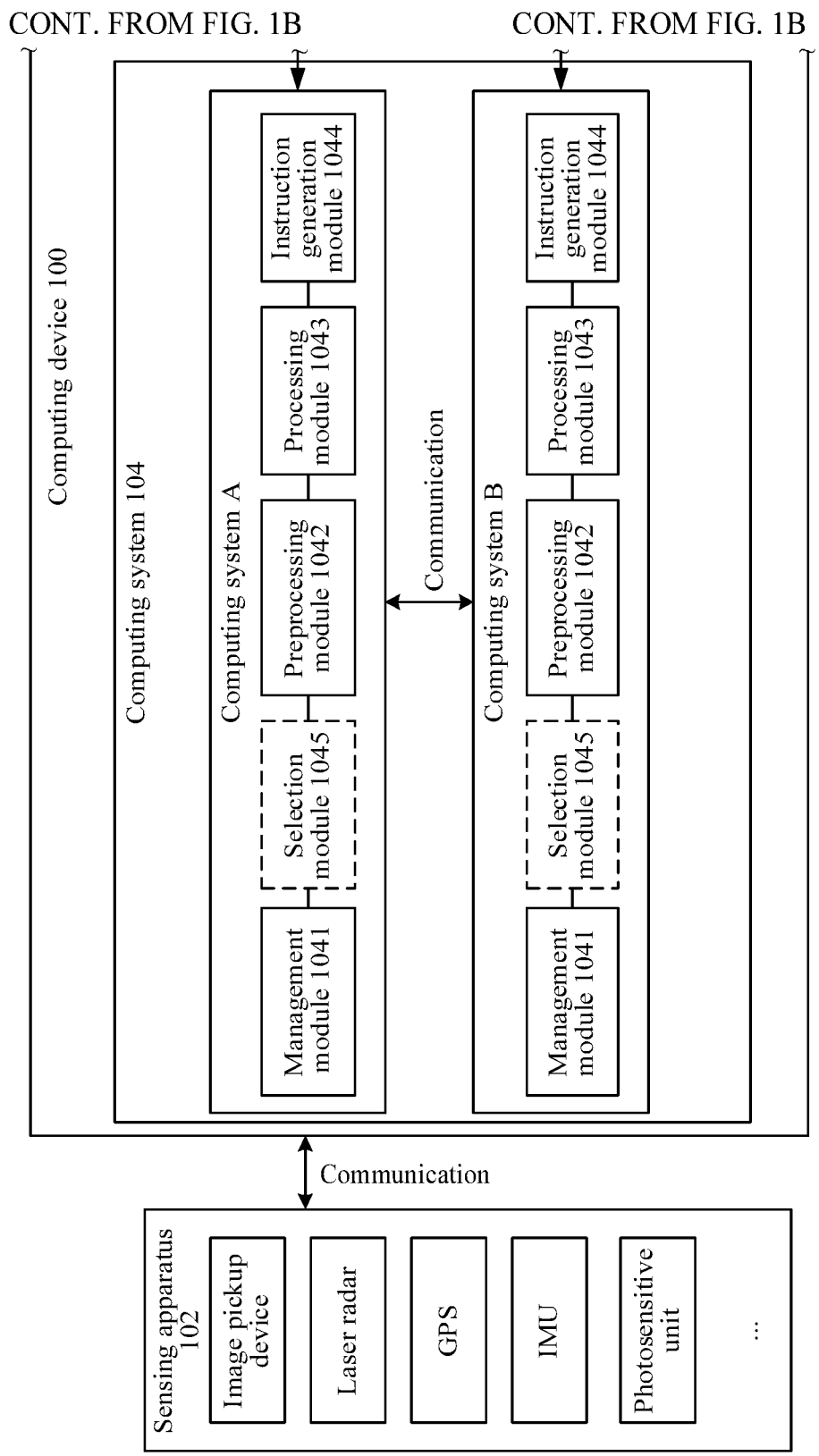

When there are a plurality of microcontroller units 106, a quantity of the microcontroller units 106 needs to be less than or equal to a quantity of the computing systems 104. Each microcontroller unit 106 may be configured to manage one or more computing systems 104, and each computing system 104 may be correspondingly managed by one microcontroller unit 106. Any two microcontroller units 106 may exchange running statuses of computing systems separately monitored by the microcontroller units 106, such that the computing device can determine a computing system 104 whose running status is a health state, and further control safe driving of the vehicle based on a processing result obtained by the computing system 104 whose running status is a health state. FIG. 1B and FIG. 1C are a schematic diagram of a structure of another computing device. As shown in FIG. 1B and FIG. 1C, the computing device is shown using two computing systems and two microcontroller units as an example. The two computing systems are respectively a computing system A and a computing system B, and the two microcontroller units are respectively a microcontroller unit A and a microcontroller unit B. The microcontroller unit A communicates with the computing system A, and is configured to manage and monitor the computing system A. The microcontroller unit B communicates with the computing system B, and is configured to manage and monitor the computing system B.

Correspondingly, the microcontroller unit A and the microcontroller unit B may mutually exchange running statuses of the computing systems separately monitored by the microcontroller unit A and the microcontroller unit B. Assuming that the running status of the computing system A is a fault state (in other words, the computing system A is faulty and is unavailable), by exchanging the statuses between the microcontroller unit A and the microcontroller unit B, the microcontroller unit B may determine that the running status of the computing system B is a health state, and the running status of the computing system A is a fault state, and the microcontroller unit B may obtain a processing result of the computing system B, to control safe driving of a vehicle based on the processing result. Details about the processing result and how to control safe driving of the vehicle based on the processing result are described below in the present disclosure.

In an optional embodiment, the following describes some structures in the microcontroller unit 106. As shown in FIG. 1A or FIG. 1B, the microcontroller unit 106 (for example, the microcontroller unit A or the microcontroller unit B shown in FIG. 1B) includes a monitoring module 1061, an arbitration module 1062, and an interconnection module 1063.

The monitoring module 1061 is configured to monitor a running status of at least one computing system 104 that communicates with the microcontroller unit 106. For example, the monitoring unit 1061 may obtain, by means of monitoring, the running status of the computing system 104 using hardware, software, a heartbeat message, or the like. For details about how the monitoring unit 1061 obtains the running status of the computing system 104 by means of monitoring, refer to related descriptions in the foregoing embodiment. Details are not described herein again.

The arbitration module 1062 is configured to determine, based on the running status that is of the computing system 104 and that is obtained by the monitoring module 1061 by means of monitoring, whether the computing system 104 is faulty, and further notify the interconnection module 1063 whether to control safe driving of the vehicle according to a control instruction generated by the computing system 104 that is not faulty. For example, when determining that the running status of the computing system that communicates with the microcontroller unit 106 is a health state (in other words, the computing system is not faulty), the arbitration module 1062 may notify the interconnection module 1063 to control safe driving of the vehicle according to a control instruction generated by the computing system. Otherwise, when determining that the running status of the computing system that communicates with the microcontroller unit 106 is a fault state (in other words, the computing system is faulty), the arbitration module 1062 may end a process or report a fault notification message that is used to notify that the computing system is faulty.

The interconnection module 1063 is configured to control safe driving of the vehicle. For example, after receiving a notification from the arbitration module 1062, the interconnection module 1063 may control safe driving of the vehicle according to the control instruction generated by the computing system 104 that is not faulty.

During implementation, there are the following two implementation scenarios. In a first implementation scenario, one microcontroller unit 1061 is deployed in the computing device, and the one microcontroller unit 1061 is responsible for interconnecting with/managing a plurality of computing systems 104. For example, there may be a plurality of monitoring modules 1061 in the microcontroller unit 106, and each monitoring module 1061 is responsible for monitoring a running status of one computing system 104. Further, the arbitration module 1062 determines, based on running statuses of a plurality of computing systems, a computing system whose running status is a health state (in other words, a computing system that is not faulty). Further, the interconnection module 1063 controls safe driving of the vehicle according to a control instruction that is generated by the determined computing system.

As shown in FIG. 1A, one microcontroller unit 106 is configured to manage two computing systems (the computing system A and the computing system B). The microcontroller unit 106 separately obtains a running status of the computing system A and a running status of the computing system B by means of monitoring using the monitoring module 1061, and sends the running statuses to the arbitration module 1062 for arbitration. A quantity of the monitoring modules 1061 in the microcontroller unit 106 is not limited. Using two monitoring modules 1061 as an example, the microcontroller unit 1061 obtains the running status of the computing system A by means of monitoring using one monitoring module, and obtains the running status of the computing system B by means of monitoring using the other monitoring module. This is not limited in the present disclosure.

Correspondingly, the arbitration module 1062 determines, based on the received running statuses of the computing system A and the computing system B, a computing system whose running status is a health state, in other words, determines a computing system that is not faulty. Further, the interconnection module 1063 controls safe driving of the vehicle according to a control instruction that is generated by the determined computing system. For example, assuming that the computing system A is faulty or the computing system B is not faulty, the arbitration module 1062 may determine that the running status of the computing system B is a health state, and further controls safe driving of the vehicle using the interconnection module 1063 and according to a control instruction generated by the computing system B.

In a second implementation scenario, a plurality of microcontroller units 1061 are deployed in the computing device, and each microcontroller unit 1061 is responsible for managing one computing system 104. For example, a monitoring module 1061 in each microcontroller unit 106 is responsible for monitoring a running status of one computing system. Correspondingly, after each microcontroller unit 106 obtains a running status of a computing system monitored by the microcontroller unit 106, the plurality of microcontroller units 106 may exchange running statuses of computing systems monitored by the plurality of microcontroller units 106. Correspondingly, after receiving a running status of a computing system sent by another microcontroller unit, any microcontroller unit 106 determines, using an arbitration module 1062 of the microcontroller unit 106 and based on running statuses of a plurality of computing systems that are received and obtained by means of monitoring by the microcontroller unit 106, a computing system whose running status is a health state. Therefore, the computing device controls safe driving of the vehicle using the microcontroller unit 106 that is correspondingly managed by the determined computing system and using an interconnection module 1063 in the microcontroller unit 106 and according to a control instruction generated by the determined computing system.

As shown in FIG. 1B and FIG. 1C, two microcontroller units are configured to interconnect with and manage two computing systems. For example, the microcontroller unit A manages the computing system A, and the microcontroller unit B manages the computing system B. Schematic diagrams of structures of the microcontroller unit A and the microcontroller unit B each include a monitoring module 1061, an arbitration module 1062, and an interconnection module 1063.

For example, the monitoring module 1061 in the microcontroller unit A may obtain a running status of the computing system A by means of monitoring, and the monitoring module 1061 in the microcontroller unit B may obtain a running status of the computing system B by means of monitoring. After the microcontroller unit A and the microcontroller unit B obtain the running statuses of the computing systems that are respectively monitored by the microcontroller unit A and the microcontroller unit B, the microcontroller unit A and the microcontroller unit B may exchange the running statuses of the computing systems that are respectively obtained by the microcontroller unit A and the microcontroller unit B. In this case, both the microcontroller unit A and the microcontroller unit B can learn the running status of the computing system A and the running status of the computing system B.

Correspondingly, the arbitration modules 1062 in the microcontroller unit A and the microcontroller unit B each may determine, based on the running statuses of the computing systems A and B, a computing system whose running status is a health state, for example, the computing system A or the computing system B. Herein, it is assumed that the running status of the computing system A is a health state, and the running status of the computing system B is a fault state. Because the running status of the computing system B is a fault state (in other words, the computing system B is faulty), the computing device may select the microcontroller unit A that communicates with the computing system A to control implementation of safe driving of the vehicle. For example, the computing device may control safe driving of the vehicle using the interconnection module 1063 in the microcontroller unit A and according to a control instruction generated by the computing system A.

Optionally, when each microcontroller unit 106 determines that the running status of each computing system is a health state, the microcontroller units 106 may exchange a primary-secondary relationship of the computing systems, to further control safe driving of the vehicle based on the interconnection module 1063 in the microcontroller unit 106 that is correspondingly managed by a primary computing system. For example, in the example in FIG. 1B and FIG. 1C, when exchanging the running statuses of the computing systems obtained by the microcontroller unit A and the microcontroller unit B, the microcontroller unit A and the microcontroller unit B may further exchange attribute information (which may be attribute information used to describe a primary-secondary relationship of the computing systems) of the computing systems respectively monitored by the microcontroller unit A and the microcontroller unit B. Herein, it is assumed that the running statuses of the computing system A and the computing system B each are a health state, the computing system A is a primary computing system, and the computing system B is a secondary computing system. Correspondingly, the microcontroller unit A and the microcontroller unit B may learn, by exchanging information, that neither the computing system A nor the computing system B is faulty, and the computing system A is the primary computing system. Further, the computing device may determine to control implementation of safe driving of the vehicle using the microcontroller unit A that interconnects with and manages the computing system A. For example, the computing device controls safe driving of the vehicle by invoking the interconnection unit 1063 in the microcontroller unit B and according to a control instruction generated by the primary computing system A.

It should be noted that the microcontroller unit 106 shown in FIG. 1A or FIG. 1B may include more or fewer components in actual application, and the figure is only an example and constitutes no limitation. This is not limited in the present disclosure. In actual application, each module or each unit shown in FIG. 1A or FIG. 1B and FIG. 1C may be implemented using software or hardware. When software is used, each module or each unit shown in the figure may be a software module. When hardware is used, each module or each unit shown in the figure may be implemented using an application-specific integrated circuit (ASIC), or a programmable logic device (PLD). The PLD may be a complex programmable logical device (CPLD), a field programmable gate array (FPGA), a generic array logic (GAL), or any combination thereof. This is not limited in the present disclosure.

The computing device in this embodiment of the present disclosure may include but is not limited to any one of the following: a vehicle, a mobile phone, a tablet personal computer, a personal digital assistant (PDA), a mobile internet device (MID), a wearable device, a vehicle-mounted device, another device that supports network communications, or the like.

Figure 4:
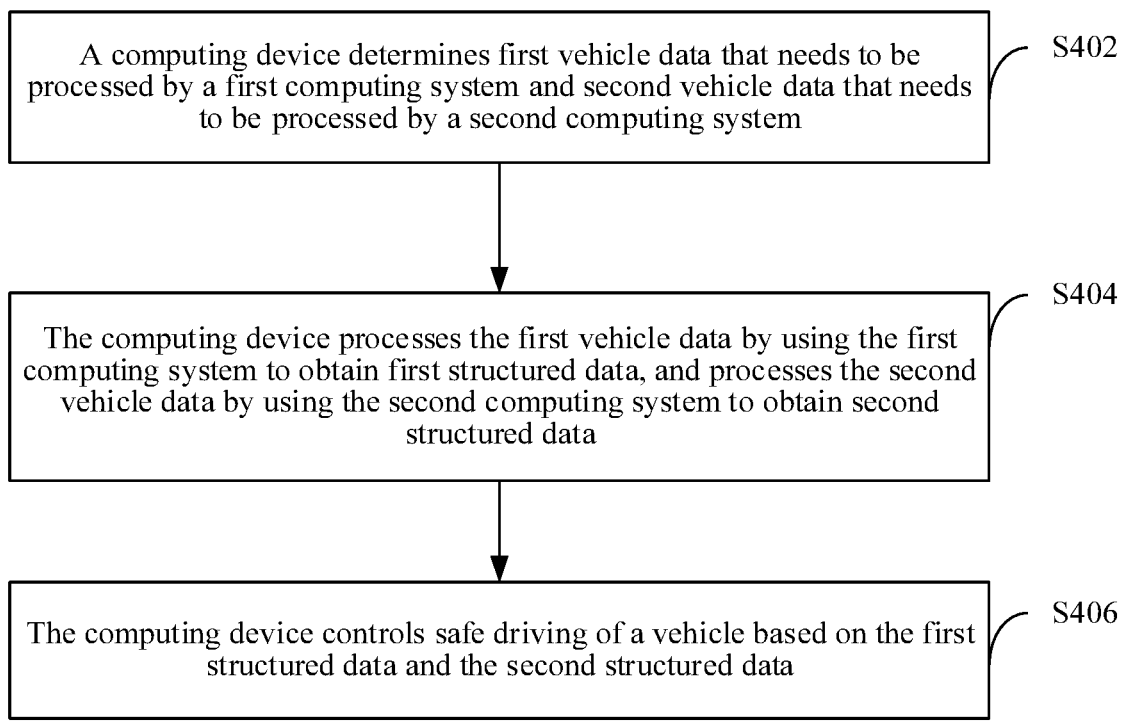
FIG. 4 is a schematic flowchart of a vehicle control method according to an embodiment of the present disclosure.

Based on the foregoing embodiment, the following describes a vehicle control method in the present disclosure. FIG. 4 is a schematic flowchart of a vehicle control method according to an embodiment of the present disclosure. The vehicle control method is applied to a computing device including at least two computing systems. In this embodiment of the present disclosure, two computing systems that are respectively a first computing system and a second computing system are used as an example to describe related embodiments of vehicle control. When there at least two computing systems, refer to the vehicle control method described below in the embodiment of the present disclosure. The method shown in FIG. 4 may include the following implementation steps.

Step S402: A computing device determines first vehicle data that needs to be processed by a first computing system and second vehicle data that needs to be processed by a second computing system. The first vehicle data is environment data that is within a first sensing scope and that is detected by a first group sensing apparatus at a first time point, and the second vehicle data is environment data that is within a second sensing scope and that is detected by a second group sensing apparatus at the first time point.

In the present disclosure, the computing device may determine vehicle data that needs to be processed by each computing system. The vehicle data herein refers to environment data that is obtained by scanning and detecting an environment within a preset sensing scope at a specific time point (for example, a first time point) by a group sensing apparatus for which each computing system is correspondingly responsible. The vehicle data may also be referred to as sensor data. Each computing system is responsible for processing sensor data collected by one group sensing apparatus, and the sensor data collected by the one group sensing apparatus may be correspondingly processed by one or more computing systems. This is not limited in the present disclosure.

Herein, two computing systems are used as an example. The computing device needs to determine the first vehicle data that needs to be processed by the first computing system and the second vehicle data that needs to be processed by the second computing system. The first vehicle data may be environment data that is obtained by the first group sensing apparatus by detecting an environment in the first sensing scope at the first time point. The second vehicle data may be environment data that is obtained by the second group sensing apparatus by detecting an environment in the second sensing scope at the first time point. The first group sensing apparatus herein is a sensing apparatus responsible for interconnecting with the first computing system. The second group sensing apparatus is a sensing apparatus responsible for interconnecting with the second computing system. The quantity of sensing apparatuses included in each group sensing apparatus is not limited. The sensing apparatuses included in the first group sensing apparatus and the second group sensing apparatus may be the same or different. This is not limited in the present disclosure. Correspondingly, the first sensing scope correspondingly detected by the first group sensing apparatus and the second sensing scope correspondingly detected by the second group sensing apparatus may also be the same or different. This is not limited in the present disclosure. Optionally, a preset sensing scope (for example, the first sensing scope or the second sensing scope) corresponding to each group sensing apparatus may be a 360-degree panoramic visual scope in an environment of the vehicle, in other words, each group sensing apparatus can collect panorama data in the current environment within the panoramic visual scope. For details about how the sensing apparatus detects and obtains environment data within the preset sensing scope, refer to related descriptions in the foregoing embodiment.

It should be noted that, even if the preset sensing scope corresponding to each group sensing apparatus may be a 360-degree panoramic visual scope, restricted by a factor such as hardware limitation or different deployment angles of the group sensing apparatus, sensor data collected by each group sensing apparatus varies. Using the first group sensing apparatus and the second group sensing apparatus as an example, the first vehicle data collected by the first group sensing apparatus is different from the second vehicle data collected by the second group sensing apparatus.

The following describes embodiments related to a group sensing apparatus and a computing system. The sensing apparatus in the present disclosure may be deployed in a device using a group concept. A quantity of groups needs to be less than or equal to a quantity of computing systems, to ensure that each computing system correspondingly processes sensor data collected by one group sensing apparatus, and the sensor data collected by each group sensing apparatus may be processed by one or more computing systems. A rule of group deployment of sensing apparatuses may include at least one of the following: 1. Each group sensing apparatus can collect panorama data in a current environment. When any group sensing apparatus is faulty, the panorama data in the current environment may be collected using another group sensing apparatus, and the panorama data herein refers to data obtained by the group sensing apparatus by scanning and detecting a panorama (a 360-degree scene) of the current environment. 2. A data volume of sensor data collected by each group sensing apparatus is roughly the same. In other words, a difference between data volumes of sensor data collected by any two group sensing apparatuses is less than or equal to a preset threshold. The preset threshold is defined by a system, for example, an empirical value set based on user experience, or obtained by means of statistics collection based on a series of experimental data.

In actual application, each sensing apparatus may be in communication connection with one or more computing systems. The communication connection may be a wired connection or a wireless connection, and this is not limited in the present disclosure. When there is a wired connection between a sensing apparatus and a computing system, the computing device may deploy, using the foregoing rule of group deployment of sensing apparatuses, each group sensing apparatus that meets a requirement for panoramic data obtaining and/or data volume balancing as being communicatively connected to a corresponding computing system in a wired manner. Therefore, the computing system can subsequently directly determine, based on a wired communication connection mode, sensor data that is collected by a group sensing apparatus and that needs to be processed by the computing system.

When there is a wireless connection between a sensing apparatus and a computing system, the computing device may select, using the foregoing rule of group deployment of sensing apparatuses and using software and from all sensing apparatuses that communicate with the computing system, one group sensing apparatus that can meet a requirement for panorama data obtaining and/or data volume balancing, and further determines that the computing system is responsible for processing sensor data collected by the group sensing apparatus.

Figure 3A:
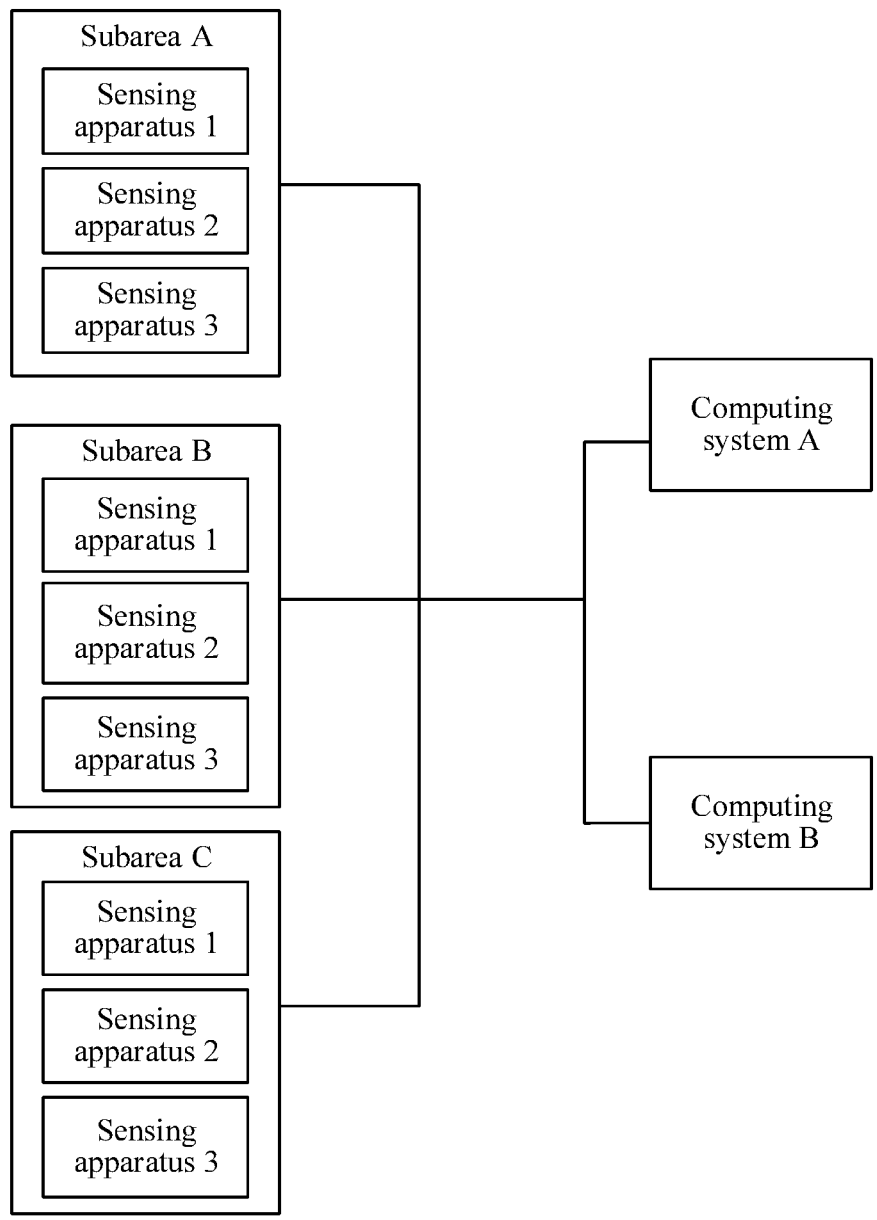
FIG. 3A and FIG. 3B are schematic diagrams of scenarios of two communication connections according to an embodiment of the present disclosure.
Figure 3B:
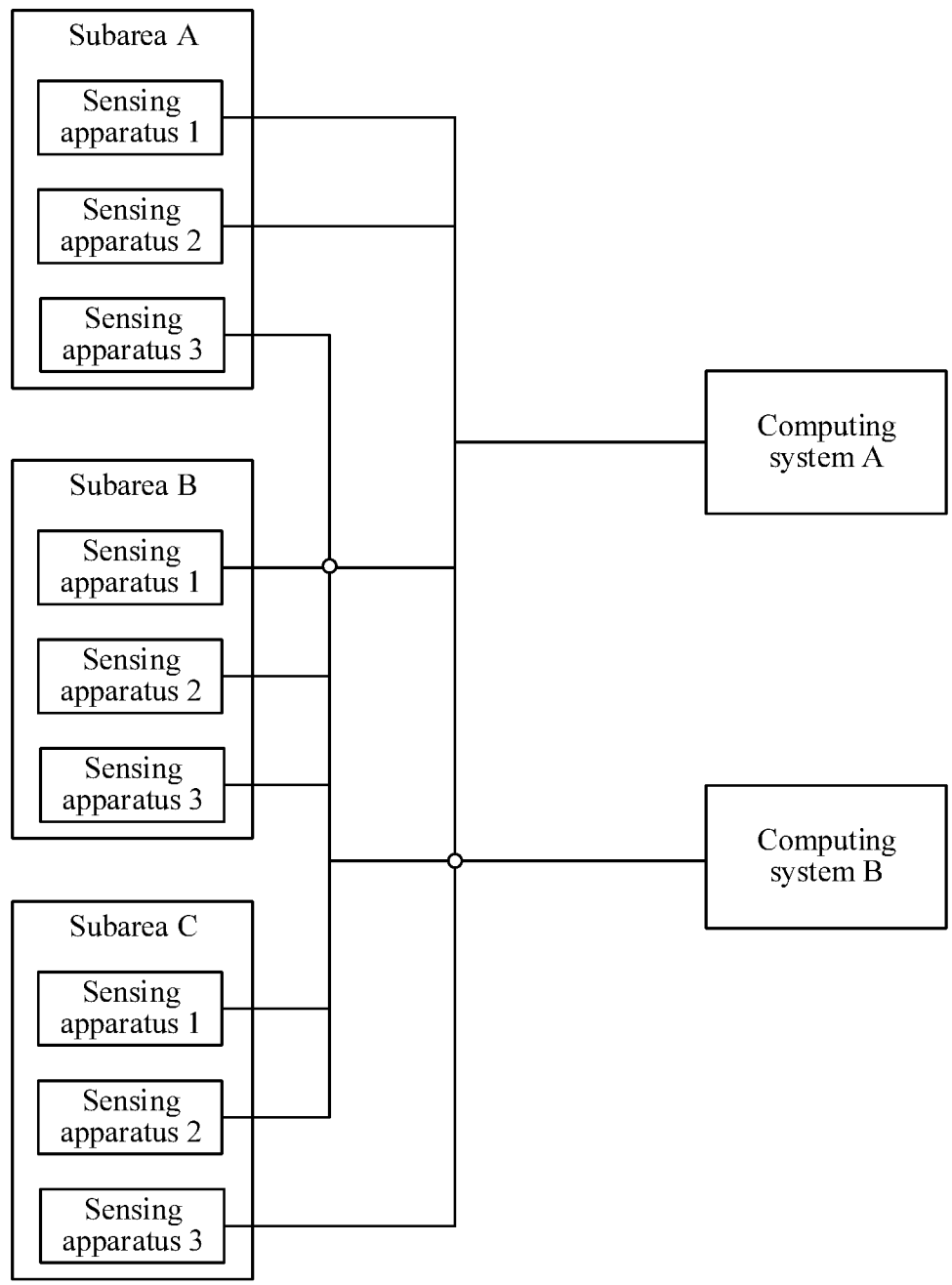

For example, FIG. 3A and FIG. 3B are schematic diagrams of two communication connections. FIG. 3A is a schematic diagram of a wireless communication connection. FIG. 3B is a schematic diagram of a wired communication connection. In a computing device shown in the figure, two computing systems are deployed: a computing system A and a computing system B. In addition, sensing apparatuses in three subareas, namely, a subarea A, a subarea B, and a subarea C, are deployed in the computing device. For example, the computing device is divided based on directions (for example, front, rear, left, and right direction) of an environment of the computing device. The subarea A may be a forward subarea, the subarea B may be a backward subarea, and the subarea C may be a side subarea, and may include a left side subarea, a right side subarea, and the like. Three sensing apparatuses are included (deployed) in each subarea: a sensing apparatus 1, a sensing apparatus 2, and a sensing apparatus 3.

As shown in FIG. 3A, each sensing apparatus in the three subareas may be connected to the computing system A and the computing system B. Correspondingly, when the computing system subsequently processes data, the computing device may group the sensing apparatuses in the three subareas using software, to ensure that a first group sensing apparatus corresponding to the computing system A and a second group sensing apparatus corresponding to the computing system B can collect panorama data, and can meet a data volume balancing rule. For example, the first group sensing apparatus includes a sensing apparatus 1 in a subarea 1, sensing apparatuses 2 and 3 in a subarea 2, and a sensing apparatus 1 in a subarea 3. The second group sensing apparatus includes sensing apparatuses 2 and 3 in the subarea 1, a sensing apparatus 1 in the subarea 2, and sensing apparatuses 2 and 3 in the subarea 3.

As shown in FIG. 3B, some sensing apparatuses in the three subareas are connected to the computing system A in a wired manner, and some sensing apparatuses are connected to the computing system B in a wired manner. For example, in FIG. 3B, the sensing apparatuses 1 and 2 in the subarea A, the sensing apparatus 1 in the subarea B, and the sensing apparatus 3 in the subarea C are connected to the computing system A in a wired manner, the sensing apparatus 3 in the subarea A, the sensing apparatus 2 in the subarea B, and the sensing apparatus 1 in the subarea C may be separately connected to the computing system A and the computing system B in a wired manner, and the sensing apparatus 3 in the subarea B and the sensing apparatus 2 in the subarea C may be connected to the computing system B in a wired manner. Optionally, to ensure integrity of data coverage and meet a high computing power requirement of a computing system, the computing device may deploy the sensing apparatuses in FIG. 3B using the foregoing rule of group deployment of sensing apparatuses. Correspondingly, in FIG. 3B, all sensing apparatuses that are connected to the computing system A in a wired manner form the first group sensing apparatus, and all sensing apparatuses that are connected to the computing system B in a wired manner form the second group sensing apparatus. Therefore, the computing system A can process the sensor data collected by the first group sensing apparatus, and the computing system B can process the sensor data collected by the second group sensing apparatus. This is not limited in the present disclosure.

In other words, in the present disclosure, there is a correspondence (also referred to as an association relationship or a binding relationship) between a group sensing apparatus and a computing system. The computing system can determine, based on the correspondence, sensor data (namely, vehicle data) that is collected by the group sensing apparatus and that needs to be processed by the computing system. The correspondence may be defined by a system, or may be customized by a user based on an actual requirement or a personal preference. For example, the computing device may match in advance, according to the foregoing rule of group deployment of sensing apparatuses, a group sensing apparatus that meets a requirement of panorama data obtaining and/or data volume balancing to a corresponding computing system. For example, when deploying the group sensing apparatus, the computing device directly deploys the group sensing apparatus as a sensing apparatus connected to the computing system in a wired manner, or creates a correspondence between the group sensing apparatus and the computing system, for example, stores the correspondence in a form of a text or a table. This is not limited in the present disclosure.

In an example in which the computing systems include the first computing system and the second computing system, the computing device may determine, based on a pre-stored correspondence between the first computing system and the first group sensing apparatus, that vehicle data that needs to be processed by the first computing system is the sensor data collected by the first group sensing apparatus, (i.e., the sensor data that is obtained by the first group sensing apparatus by detecting the current environment within the first sensing scope). Correspondingly, the computing device may determine, based on a pre-stored correspondence between the second computing system and the second group sensing apparatus, that vehicle data that needs to be processed by the second computing system is the sensor data collected by the second group sensing apparatus, (i.e., the sensor data that is obtained by the second group sensing apparatus by detecting the current environment within the second sensing scope).

In the present disclosure, the computing device may learn, according to the foregoing rule of group deployment of sensing apparatuses, that the step S402 may be implemented in the following several manners.

In a first implementation, the computing device determines, based on a data volume of sensor data collected by a sensing apparatus, sensor data that is collected by a group sensing apparatus and that is correspondingly processed by a computing system, to ensure that a data volume of sensor data processed by each computing system is roughly the same. In other words, a difference between data volumes of sensor data that needs to be processed by any two computing systems is less than or equal to a preset threshold, and the preset threshold is defined by a system.

In an example in which the computing systems include the first computing system and the second computing system, the computing systems may allocate sensing apparatuses according to a data volume balancing rule. For example, the first vehicle data that needs to be processed by the first computing system is the sensor data collected by the first group sensing apparatus, and the second vehicle data that needs to be processed by the second computing system is the sensor data collected by the second group sensing apparatus. In addition, a difference between a data volume of the first vehicle data and a data volume of the second vehicle data is less than or equal to the preset threshold, for example, 0.

For example, the sensing apparatuses are image pickup devices, and resolutions of image data collected by different image pickup devices may be different. In other words, computing power (or a data volume of the image data) required when the computing device processes the image data of the resolutions using the computing systems is also different. It is assumed that five image pickup devices are deployed in the computing device: an image pickup device A, an image pickup device B, an image pickup device C, an image pickup device D, and an image pickup device E. The resolution of the image pickup device A is 3840×2160, the resolution of the image pickup device B and the resolution of the image pickup device C are both 1920×1080, and the resolution of the image pickup device D and the resolution of the image pickup device E are both 960×540. In a data processing process, considering a data volume balancing (namely, computing power balancing) rule of each computing system, the computing device may use the image pickup device A and the image pickup device D as the first group sensing apparatus, and allocate the first group sensing apparatus to the first computing system; and the computing device may use the image pickup devices B, C, and E as the second group sensing apparatuses, and allocate the second group sensing apparatuses to the second computing system. In other words, to implement computing power balancing and reduce a computing volume of a single computing system, the computing device processes, using the first computing system, image data collected by the first group sensing apparatus (which may be the image pickup devices A and D), and processes, using the second computing system, image data collected by the second group sensing apparatus (which may be the image pickup devices B, C, and E).

In a second implementation, the computing device may determine, based on deployment positions of different sensing apparatuses, sensor data that is collected by a group sensing apparatus and that needs to be processed by a computing system, to use the sensor data as vehicle data that needs to be processed by the computing system. The group sensing apparatus includes one or more sensing apparatuses. To ensure comprehensiveness of data coverage, each group sensing apparatus includes a sensing apparatus deployed in each direction (or subarea). The direction herein refers to a deployment direction of the sensing apparatus, and may be defined and deployed by a system. For example, a group sensing apparatus corresponding to each computing system includes the forward sensing apparatus, the backward sensing apparatus, the left sensing apparatus, the right sensing apparatus, the all-round looking sensing apparatus, and the like in the example shown in FIG. 2B. This is not limited in the present disclosure.

In other words, each computing system can control or interconnect with group sensing apparatuses that are deployed in all directions, such that after any computing system in the computing device is faulty, a computing system that is not faulty can collect panorama data in the current environment based on a group sensing apparatus corresponding to the computing system, and therefore controls safe driving of the vehicle, and the like. This helps improve driving safety of the vehicle.

Figure 5A:
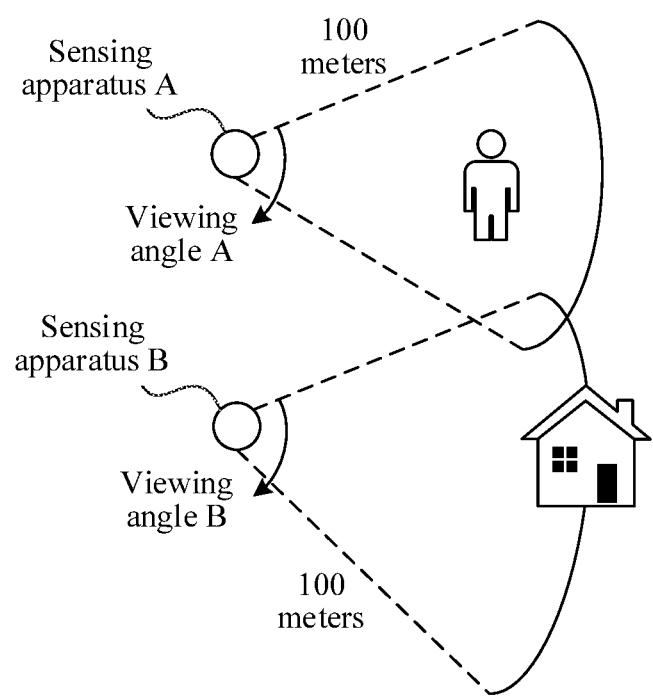
FIG. 5A is a schematic diagram of another sensing apparatus detection scenario according to an embodiment of the present disclosure.

For example, the computing systems include the first computing system and the second computing system. It is assumed that in the computing device, sensing apparatuses are deployed in five subareas: a subarea A, a subarea B, a subarea C, a subarea D, and a subarea E. Three forward sensing apparatuses (which may be forward sensing apparatuses 1 to 3) are deployed in the subarea A, two backward sensing apparatuses (which may be backward sensing apparatuses 1 and 2) are deployed in the subarea B, two left sensing apparatuses (which may be left sensing apparatuses 1 and 2) are deployed in the subarea C, four right sensing apparatuses (which may be right sensing apparatuses 1 to 4) are deployed in the subarea D, and two all-round looking sensing apparatuses are deployed in the subarea E. In consideration of global control of each computing system, the computing device may use the forward sensing apparatuses 1 and 2 in the subarea A, the backward sensing apparatus 2, the left sensing apparatus 1, the right sensing apparatuses 1 and 2, and an all-round looking sensing apparatus 1 as the first group sensing apparatus, and allocates the first group sensing apparatus to the first computing system. In other words, the computing device may use data collected by the first group sensing apparatus as the first vehicle data that needs to be processed by the first computing system. Correspondingly, the computing device may use the forward sensing apparatus 3 in the subarea A, the backward sensing apparatus 1, the left sensing apparatus 2, the right sensing apparatuses 3 and 4, and an all-round looking sensing apparatus 2 as the second group sensing apparatus, and allocates the second group sensing apparatus to the second computing system, in other words, uses data collected by the second group sensing apparatus as the second vehicle data that needs to be processed by the second computing system. Optionally, detection scopes of any two sensing apparatuses deployed in a same direction may be the same, may be different, or may be not totally the same, for example, some parts of the detection scopes overlap. For example, FIG. 5A is a schematic diagram of a detection scenario of two forward sensing apparatuses. As shown in FIG. 5A, a detection scope of a sensing apparatus A is an area covered using a detection distance of 100 meters and a viewing angle A, and a detection scope of a sensing apparatus B is an area covered using a detection distance of 100 meters and a viewing angle B. As shown in FIG. 5A, the detection scopes of the sensing apparatus A and the sensing apparatus B are not totally the same, and some areas overlap.

Optionally, the computing device may further combine the first and second implementations. When data volume balancing is met, the computing device may further consider deployment positions of different sensing apparatuses, to allocate sensor data collected by the group sensing apparatuses that are deployed in all directions to a same computing system for processing. This is not limited in the present disclosure.

In a third implementation, the computing device may further determine, based on attribute information of different sensing apparatuses, sensor data that is collected by a group sensing apparatus and that needs to be processed by each computing system, to use the sensor data as vehicle data that needs to be processed by the computing system. For example, the computing device may use at least one sensing apparatus having same attribute information as one group sensing apparatus, and allocates data collected by the group sensing apparatus to a same computing system for processing. The attribute information is information used to describe an attribute of a sensing apparatus, for example, the attribute information may include but is not limited to a working frequency (which may also be referred to as a sampling frequency) of the sensing apparatus, a type of the sensing apparatus, a category to which the sensing apparatus belongs, a function of the sensing apparatus, and the like.

For example, the sensing apparatus includes a radar sensor, an image pickup device, and a laser measurement unit. A data volume of sensor data collected by the radar sensor within a unit time is Q1, a data volume of sensor data collected by the image pickup device within a unit time is Q2, and a data volume of sensor data collected by the laser measurement unit within a unit time is Q3. To ensure a balanced data volume for each computing system, the computing device needs to implement balanced allocation based on a data volume of sensor data collected by each sensing apparatus. It is assumed that working duration of the three sensing apparatuses are the same, Q1=1, Q2=2, and Q3=3. To implement data volume balancing, the computing device may use the radar sensor and the laser measurement unit as the first group sensing apparatus, to allocate sensor data collected by the first group sensing apparatus to the first computing system for processing, and may use the image pickup device as the second group sensing apparatus, and allocate sensor data collected by the second group sensing apparatus to the second computing system for processing.

Optionally, the computing device may further determine, both in the first implementation and/or the second implementation, vehicle data that needs to be correspondingly processed by a computing system. For example, the computing device may determine, based on both attribute information of a sensing apparatus and a data volume of sensor data collected by the sensing apparatus, sensor data that is collected by a group sensing apparatus and that needs to be processed by each computing system, to use the sensor data as vehicle data that needs to be processed by the computing system. Therefore, the computing device ensures that the data volume of the sensor data that needs to be processed by each computing system is balanced, and that group sensing apparatuses corresponding to a same computing device have same attribute information. This is not limited in the present disclosure.

It should be noted that, both the first vehicle data and the second vehicle data in the present disclosure are sensor data collected by group sensing apparatuses, and may be the same or may be different depending on the group sensing apparatuses that respectively collect the first vehicle data and the second vehicle data. The first vehicle data or the second vehicle data may include but is not limited to radar data collected using a radar sensor, laser data collected using a laser measurement unit, location data collected using a GPS, photosensitive data collected using a photosensitive unit, and the like.

Step S404: The computing device processes the first vehicle data using the first computing system, to obtain first structured data, where the first structured data is used to represent an environment that is of a vehicle at the first time point and that is detected by the first group sensing apparatus. Correspondingly, the computing device may process the second vehicle data using the second computing system, to obtain second structured data, where the second structured data is used to represent an environment that is of the vehicle at the first time point and that is detected by the second group sensing apparatus.

After determining the first vehicle data, the first computing system may obtain the first vehicle data, and further process the first vehicle data, to obtain the corresponding first structured data. The processing herein includes but is not limited to preprocessing, object recognition, object detection, and the like. For example, after obtaining the first vehicle data, the first computing system may preprocess the first vehicle data, to obtain preprocessed first vehicle data. The preprocessing herein may be defined by a system, and may include but is not limited to data screening, abnormal value removal, data conversion, and the like. For example, the first vehicle data is image data collected by an image pickup device. The preprocessing includes but is not limited to image conversion, image stitching, image correction, image warping, other image processing, or the like. This is not limited in the present disclosure.

Further, the computing device may continue to process the preprocessed first vehicle data, to obtain the first structured data. For example, the computing device may process the preprocessed first vehicle data using a first preset algorithm, to obtain the first structured data, where the first structured data is used to indicate the environment that is of the vehicle at the first time point and that is detected by the first group sensing apparatus. The first preset algorithm is defined by a system, or is pre-trained by the computing device, and is used to identify a current environment of the vehicle. The first structure data includes but is not limited to an obstacle, another vehicle, a lane line, a lane width, a traffic light, a distance between a traffic light and the vehicle, a distance between the vehicle and the other vehicle, other data that reflects an environment of the vehicle, or the like.

For example, the first preset algorithm is a neural network algorithm. The first computing system may analyze the first vehicle data using the neural network algorithm, to complete detection and tracking of a target object, and obtain the first structured data. In actual application, if a detected target object is different, the used first preset algorithm may also be different. The first preset algorithm may be an algorithm that is pre-trained by a system and that is deployed in the computing device, to wait to be directly loaded and used when the target object is detected. This is not limited in the present disclosure. For example, when the target object is a traffic light, the first preset algorithm may be a convolutional neural network algorithm, and the first structured data includes information such as a traffic light, a distance between the traffic light and the vehicle, and duration of displaying each traffic light in a driving environment of the vehicle. This is not limited in the present disclosure.

Optionally, after obtaining the first vehicle data, the first computing system may manage the first vehicle data. For example, the first computing system may store the first vehicle data in a cache of the first computing system. For another example, the first computing system may delete the stored first vehicle data in real time or periodically, for example, clear the first vehicle data whose storage duration exceeds preset duration. In other words, the first computing system may clear expired data in real time or periodically. The preset duration is defined by a system, for example, set based on an actual requirement of a user.

Similarly, for details about how the second computing system processes the second vehicle data, refer to the processing performed by the first computing system on the first vehicle data. Details are not described in the present disclosure. Both the first structured data and the second structured data in the present disclosure are used to represent an environment that is of the vehicle at the first time point and that is detected by a group sensing apparatus. The first structured data and the second structured data may be the same, or may be different, depending on their respective corresponding group sensing apparatuses, and this is not limited in the present disclosure. In actual application, because during data processing, different computing systems use different data processing algorithms and have different data processing precision, the first structured data obtained by the first computing system may be different from the second structured data obtained by the second computing system.

Step S406: The computing device controls safe driving of the vehicle based on the first structured data and the second structured data.

In the present disclosure, the first structured data and the second structured data may be structured data obtained after the computing device processes sensor data collected by different group sensing apparatuses, but not the sensor data collected by all the group sensing apparatuses. In consideration of data integrity and vehicle control security, the computing systems may exchange the structured data obtained by the computing systems. Therefore, the computing device can control safe driving of the vehicle based on the structured data obtained by each computing system by processing.

For example, the computing systems include the first computing system and the second computing system. The first computing system and the second computing system in the present disclosure may exchange the obtained first structured data and second structured data. For example, the first computing system may actively send a data request to the second computing system based on an actual requirement, to obtain the second structured data. Alternatively, after obtaining the second structured data by computing, the second computing system may broadcast the second structured data to another computing system, such that the other computing system obtains and uses the second structured data. Correspondingly, with reference to the related description of obtaining the second structured data by the first computing system, the second computing system may also obtain the first structured data processed by the first computing system. Details are not described herein again. Further, the computing device controls safe driving of the vehicle based on the first structured data and the second structured data using the first computing system or the second computing system. There are the following several implementations. In a first implementation, when neither the first computing system nor the second computing system is faulty, the computing device may control safe driving of the vehicle according to control instructions respectively generated by the two computing systems. The control instructions are generated by the computing systems based on the first structured data and the second structured data.

For example, the computing device may obtain a running status of each of the first computing system and the second computing system by means of monitoring using a microcontroller unit. Further, the computing device determines, based on the running statuses of the first computing system and the second computing system, whether the first computing system and the second computing system are faulty.

For details about how the computing device determines, using a microcontroller unit, whether the first computing system or the second computing system is faulty, refer to the related descriptions in FIG. 1A or FIG. 1B and FIG. 1C. Details are not described herein again.

When the first computing system is not faulty, the first computing system may obtain a first control instruction based on the first structured data and the second structured data, and the first control instruction is used to control safe driving of the vehicle. To improve data processing precision, the first computing system may perform smoothing processing on the first structured data and the second structured data, to obtain road feature information of vehicle driving, for example, information about a location of a surrounding vehicle, a lane line, a lane quantity, a road sign, a lane width, and an area in which the vehicle can travel. Then, the first computing system generates the first control instruction based on the road feature information and positioning information of the vehicle. The positioning information may be location information that is of the vehicle in a real space and that is collected using a positioning apparatus. The positioning apparatus includes at least one of the following: a GPS, an IMU, a wheel speedometer, another component used for positioning, or the like.

The first control instruction is generated based on the first structured data and the second structured data of the vehicle when the vehicle is in the environment at the first time point, and the first control instruction is used to control safe driving of the vehicle. It may be understood that the generated first control instruction may vary with changes of the environment. For example, in a scenario in which the vehicle drives through a curve, the generated first control instruction may be used to indicate information such as a current turning direction and a current turning angle of the vehicle, to implement safe driving of the vehicle in a curve. For another example, during driving in a traffic congestion scenario, the generated first control instruction may be used to indicate a lane on which the vehicle travels, a vehicle speed, a vehicle spacing that needs to be maintained between the vehicle and another vehicle, and the like, to ensure that the vehicle implements safe driving in a congestion environment.

In actual application, in a different environment, to implement safe driving of the vehicle in the environment, an operation object that is correspondingly indicated by the first control instruction and that is in the vehicle includes but is not limited to components such as a brake, an accelerator, a steering wheel, a gear, a turn light, a fog light, a rain wiper, and the like of the vehicle. Operation processing indicated by the first control instruction includes but is not limited to speed control, route change, lane change, turning angle control, and the like. For example, the computing device implements driveway change (namely, lane change) by controlling the steering wheel, and indicates, to the vehicle by controlling the turn light, a direction for lane change that needs to be currently performed, to avoid a traffic accident, and ensure driving safety of the vehicle.

Correspondingly, when the second computing system is not faulty, the second computing system may also obtain a second control instruction based on the first structured data and the second structured data. For details, refer to the foregoing related descriptions of generating the first control instruction by the first computing system. Details are not described herein again. In actual application, control instructions generated by different computing systems may vary with different computing systems that have different data processing precision and use different algorithms during data processing. In other words, the first control instruction and second control instruction in the foregoing descriptions of the present disclosure may be different.

Because neither the first computing system nor the second computing system is faulty, the computing device may determine a vehicle control instruction according to the first control instruction generated by the first computing system and the second control instruction generated by the second computing system, and further controls safe driving of the vehicle based on the vehicle control instruction. For example, the computing device may randomly select one of the first control instruction and the second control instruction that are separately generated by the two computing systems as the vehicle control instruction. Alternatively, the computing device may select, based on a primary-secondary relationship between the computing systems and from the first control instruction and the second control instruction that are separately generated by the two computing systems, a control instruction generated by a primary computing system as the vehicle control instruction. The primary-secondary relationship between the computing systems is pre-defined by a system, for example, defined based on a user requirement or a user preference. For example, herein, in an example in which the first computing system is a primary computing system and the second computing system is a secondary computing system, after determining that neither the first computing system nor the second computing system is faulty, the computing device may determine that the first control instruction generated by the first computing system is the vehicle control instruction, to subsequently control safe driving of the vehicle according to the vehicle control instruction.

In a second implementation, when any one of the first computing system or the second computing system is faulty, the computing device may generate a corresponding control instruction based on the first structured data and the second structured data using the computing system that is not faulty, and further controls safe driving of the vehicle according to the control instruction. For example, the first computing system is faulty. After the computing device determines, using a microcontroller unit, that the first computing system is faulty, the computing device may generate the second control instruction based on the first structured data and the second structured data using the second computing system. For details about the second control instruction, refer to related descriptions in the foregoing embodiment. Details are not described herein again. Further, the computing device may control safe driving of the vehicle according to the second control instruction.

Correspondingly, after the computing device determines that the second computing system is faulty, the computing device may generate the first control instruction based on the first structured data and the second structured data using the first computing system, and further controls safe driving of the vehicle according to the first control instruction. For details about the first control instruction, refer to related descriptions in the foregoing embodiment. Details are not described herein again.

In an optional embodiment, when a plurality of computing systems are deployed in the computing device, if any computing system in the computing device is faulty, the computing device may process, using another computing system that is not faulty, vehicle data that needs to be processed, to control safe driving of the vehicle. For example, to ensure data integrity and vehicle control security, sensor data (vehicle data) that needs to be processed by a computing system that is faulty needs to be processed by a computing system that is not faulty, to ensure safe driving of the vehicle. For the computing system that is not faulty, because there is a relatively large amount of vehicle data, and the computing system is limited by computing power or hardware of the computing system, the computing system cannot meet a processing requirement of a large amount of vehicle data. In this case, dimension reduction processing (which may also be referred to as optimization processing) needs to be first performed on the vehicle data, to obtain processed vehicle data, and further implement safe driving of the vehicle based on the processed vehicle data.

Figure 6:
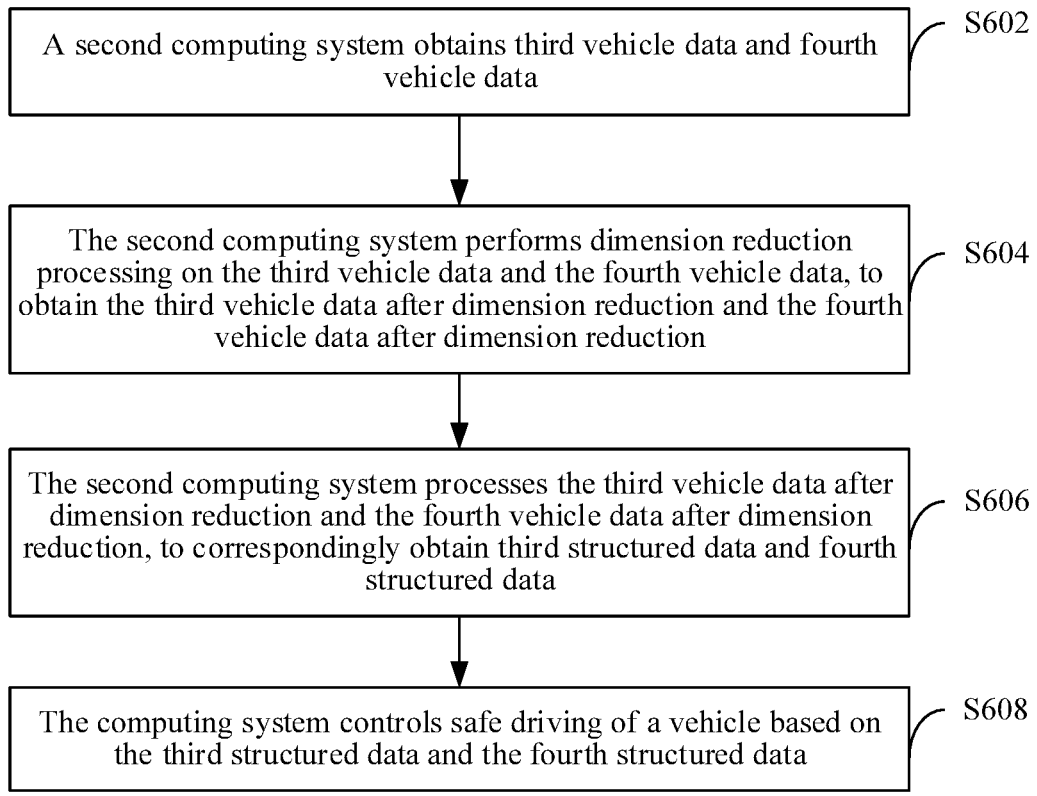
FIG. 6 is a schematic flowchart of another vehicle control method according to an embodiment of the present disclosure.

FIG. 6 is a schematic flowchart of another vehicle control method according to an embodiment of the present disclosure. In the method shown in FIG. 6, an example in which computing systems in a computing device include a first computing system and a second computing system is used to describe a related embodiment in which after any one of the two computing systems is faulty, the other computing system that is not faulty implements data processing. In the method shown in FIG. 6, that the first computing system is faulty and the second computing system is not faulty is used as an example, and the method includes the following implementation steps.

Step S602: The second computing system obtains third vehicle data and fourth vehicle data, where the third vehicle data is environment data that is within a first sensing scope and that is detected by a first group sensing apparatus at a second time point. The fourth vehicle data is environment data that is within a second sensing scope and that is detected by a second group sensing apparatus at the second time point.

In the present disclosure, after determining, using a microcontroller unit, that the first computing system is faulty, the computing device may process, using the second computing system, sensor data that is subsequently collected by a group sensing apparatus. To ensure data integrity, after the first computing system is faulty, the second computing system may obtain third vehicle data that needs to be processed by the first computing system and fourth vehicle data that needs to be processed by the second computing system, such that vehicle data that needs to be processed by the two computing systems can be subsequently processed, to ensure vehicle control security.

The third vehicle data is sensor data that is obtained by the first group sensing apparatus by detecting an environment within the first sensing scope at the second time point, and the fourth vehicle data is sensor data that is obtained by the second group sensing apparatus by detecting an environment within the second sensing scope at the second time point. The second time point is any time point after the first computing system is faulty, and is different from the first time point in the foregoing descriptions in the present disclosure.

Step S604: The second computing system performs dimension reduction processing on the third vehicle data and the fourth vehicle data, to obtain the third vehicle data after dimension reduction and the fourth vehicle data after dimension reduction. The dimension reduction processing mentioned above in the present disclosure refers to operation processing performed to reduce a computing volume of a computing system, and may include but is not limited to any one or a combination of the following: resolution reduction, frame rate reduction, reduction of a quantity of sensing apparatuses, another operation for reducing a data volume, or the like. The following uses an example for description.

In an example in which the dimension reduction processing is frame rate reduction, with reference to the foregoing example in which the first computing system is faulty, all vehicle data (which may include the third vehicle data and the fourth vehicle data) that needs to be processed by the second computing system is frame image data collected using an image pickup device. In actual application, the vehicle data that needs to be processed by the second computing system includes a plurality of frames of images. The second computing system may perform frame rate reduction on the plurality of frames of images that need to be processed, to obtain processed frame images with small data volumes. For example, the second computing system may remove even frames of images, and retain odd frames of images as the processed frame images or the like.

In an example in which the dimension reduction processing is resolution reduction, with reference to the foregoing example in which the first computing system is faulty, all vehicle data (which may include the third vehicle data and the fourth vehicle data) that needs to be processed by the second computing system is frame image data collected using an image pickup device. In actual application, the vehicle data that needs to be processed by the second computing system includes a plurality of frames of images. The second computing system may perform resolution reduction on the plurality of frames of images that need to be processed, to obtain processed frame images with small data volumes. For example, the second computing system may use a preset image algorithm to convert a frame image of first resolution into a frame image of second resolution. The first resolution is greater than the second resolution. The preset image algorithm is defined by a system, is used to reduce resolution of an image frame, and may include but is not limited to an image compression algorithm, an image reconstruction algorithm, another algorithm used to reduce resolution, or the like.

In an example in which the dimension reduction processing is reduction of a quantity of sensing apparatuses, the reduction of a quantity of sensing apparatuses in the present disclosure refers to reducing a quantity of sensing apparatuses included in a group sensing apparatus, to reduce sensor data that is collected using a sensing apparatus and that needs to be processed by a computing system. For example, referring to related descriptions in the steps S402 and S404 in the present disclosure, both the third vehicle data and the fourth vehicle data that need to be processed by a computing system are sensor data collected using the group sensing apparatus. With reference to the foregoing example in which the first computing system is faulty, to meet a computing power limitation of a single computing system, the second computing system may perform screening processing (namely, reduction of a quantity of sensing apparatuses) on the third vehicle data and the fourth vehicle data that are collected by a plurality of sensing apparatuses included in the group sensing apparatus, to be more specific, sensor data collected by some sensing apparatuses is discarded, to obtain sensor data collected by a relatively small quantity of sensing apparatuses, and use the sensor data as processed vehicle data. The relatively small quantity of sensing apparatuses can scan and detect panorama data of a current environment of a vehicle. In other words, if the second computing system supports panorama, the second computing system may select some sensing apparatuses from the plurality of sensing apparatuses, and use sensor data collected by the sensing apparatuses as the processed vehicle data.

Figure 5B:
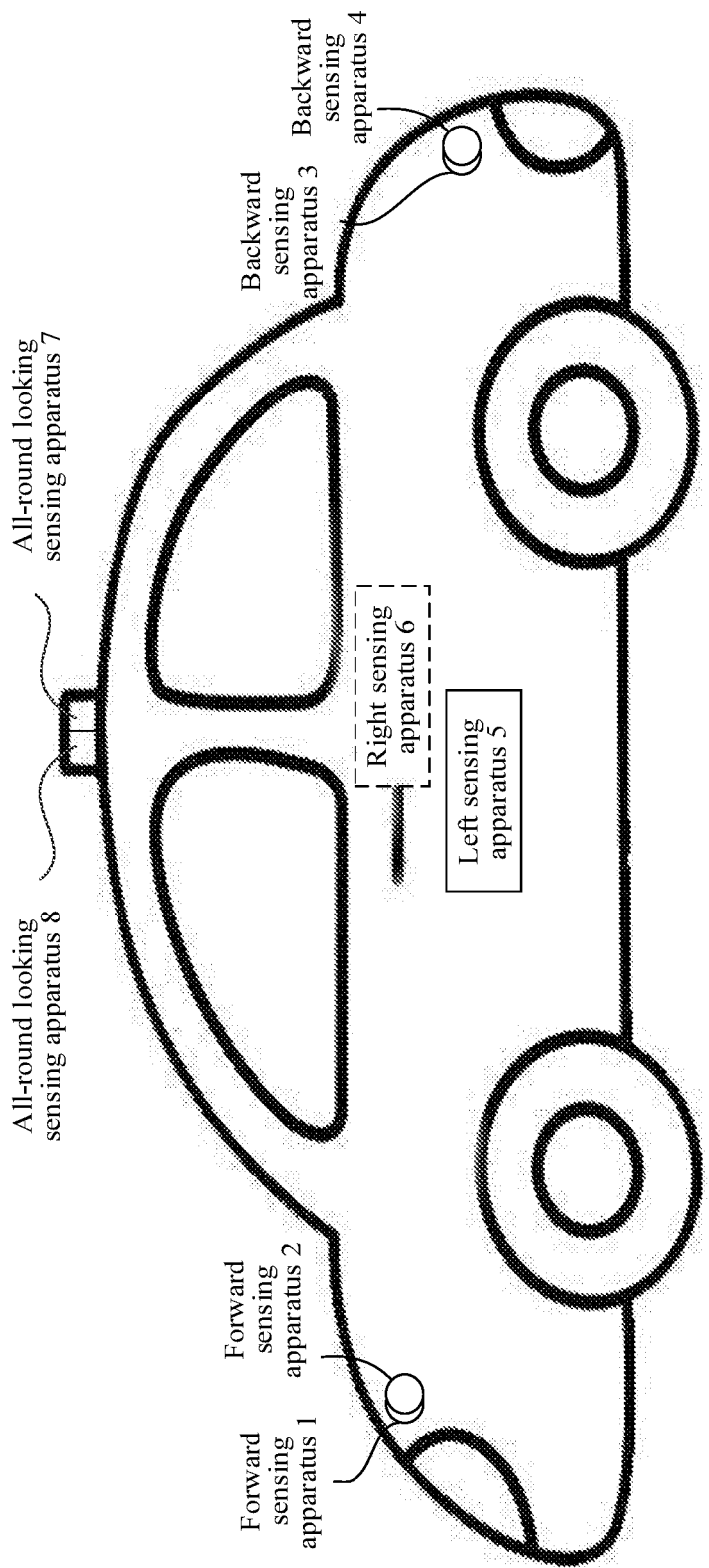
FIG. 5B is a schematic diagram of another sensing apparatus deployment scenario according to an embodiment of the present disclosure.

For example, FIG. 5B is a schematic diagram of a sensing apparatus deployment scenario. Eight sensing apparatuses are deployed in a vehicle shown in FIG. 5B: forward sensing apparatuses 1 and 2, backward sensing apparatuses 3 and 4, a left sensing apparatus 5, a right sensing apparatus 6, and all-round looking sensing apparatuses 7 and 8. As shown in the figure, the forward sensing apparatuses 1 and 2 are installed together, and have basically consistent scanning and detection scopes. In other words, the forward sensing apparatuses 1 and 2 collect same sensor data in a same scenario. Similarly, as shown in the figure, the backward sensing apparatuses 3 and 4 are deployed closely to each other, and collect same sensor data in a same scenario. The all-round looking sensing apparatuses 7 and 8 are deployed closely to each other, and also collect same sensor data in a same scenario. In this example, one forward sensing apparatus, one backward sensing apparatus, one left sensing apparatus, one right sensing apparatus, and one all-round looking sensing apparatus together may implement 360-degree scanning and detection of a current environment, to obtain panorama data of the current environment.

It is assumed that the third vehicle data that needs to be originally processed by the first computing system includes the sensor data collected by each of the foregoing sensing apparatuses 1, 3, 4, and 5, and the fourth vehicle data that needs to be originally processed by the second computing system includes the sensor data collected by each of the foregoing sensing apparatuses 2, 6, 7, and 8. If a fault suddenly occurs in the first computing system, to ensure integrity and reliability of data processing, the second computing system may obtain the third vehicle data and the fourth vehicle data, namely, the data collected by the foregoing eight sensing apparatuses, that need to be processed by the two computing systems. Limited by a computing power of a single computing system, the second computing system may select, from the data collected by the foregoing eight sensing apparatuses, data that is collected by a sensing apparatus and that can include the panorama data as the processed vehicle data. In this example, to ensure data integrity, the second computing system may select data collected by one forward sensing apparatus, one backward sensing apparatus, one left sensing apparatus, one right sensing apparatus, and one all-round looking sensing apparatus from the data collected by the foregoing eight sensing apparatuses, for example, in this example, the data collected by the sensing apparatuses 1, 3, 5, 6, and 7 may be selected as the processed vehicle data. This is not limited in the present disclosure.

Step S606: The second computing system processes the third vehicle data after dimension reduction and the fourth vehicle data after dimension reduction, to correspondingly obtain third structured data and fourth structured data. The third structured data is used to represent an environment that is of the vehicle at the second time point and that is detected by the first group sensing apparatus, and the fourth structured data is used to represent an environment that is of the vehicle at the second time point and that is detected by the second group sensing apparatus.

Step S608: The computing device controls safe driving of the vehicle based on the third structured data and the fourth structured data.

In the present disclosure, during implementation of the steps S604 to S608, the second computing system may load a preset full data algorithm (which may also be referred to as a full data model), and processes the third vehicle data and the fourth vehicle data using the full data algorithm, to obtain a corresponding control instruction for controlling safe driving of the vehicle. The preset full data algorithm is defined by a system. To reduce a loading time of the algorithm, the full data algorithm may be deployed in a cache of the second computing system in advance, to facilitate direct loading during subsequent use. Optionally, in actual application, the dimension reduction processing may or may not be implemented in the full data algorithm. To be more specific, input data of the full data algorithm may be the third vehicle data and fourth vehicle data before dimension reduction processing, or may be the third vehicle data and fourth vehicle data after the dimension reduction processing. This is not limited in the present disclosure. For details about how the second computing system implements safe driving of the vehicle based on vehicle data after dimension reduction, refer to related descriptions in the foregoing steps S404 and S406. Details are not described herein again.

In an optional embodiment, when the first computing system is faulty, the second computing system cannot obtain the third vehicle data that needs to be processed by the first computing system. In this case, the second computing system may obtain the fourth vehicle data that needs to be processed by the second computing system, and further processes only the fourth vehicle data, to obtain a corresponding control instruction. Further, safe driving of the vehicle is controlled according to an indication of the control instruction. The control instruction is generated by the second computing system and is used to control safe driving of the vehicle. A specific operation of content indicated by the control instruction is not limited in the present disclosure, for example, controlling the vehicle to decelerate as soon as possible, pull over, and the like. For details about how to process the vehicle data and control safe driving of the vehicle, refer to related descriptions in the foregoing embodiments. Details are not described herein again.

Alternatively, after the first computing system is faulty, the second computing system cannot obtain the third vehicle data that needs to be processed by the first computing system and the fourth vehicle data that needs to be processed by the second computing system. In this case, the second computing system may process pre-stored vehicle data in the second computing system, to generate a corresponding control instruction for controlling safe driving of the vehicle. Alternatively, the second computing system may directly obtain a pre-stored control instruction, to control safe driving of the vehicle according to the control instruction. The control instruction is generated by a system in a customized manner and is used to control safe driving of the vehicle. For example, the control instruction is used to control the vehicle to pull over, control the vehicle to decelerate, or the like. This is not limited in the present disclosure.

Implementation of this embodiment of the present disclosure can resolve problems in other approaches that requirements of mass production for low power consumption and high computing power cannot be met, and the like. Therefore, this reduces power consumption of data processing and improves efficiency of data processing.

Figure 7:
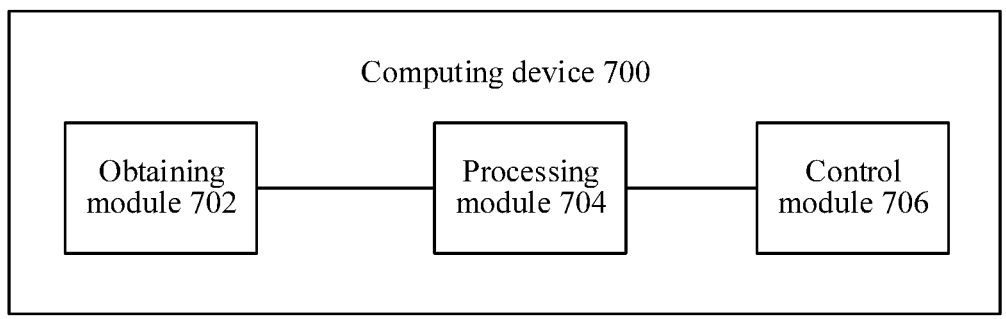
FIG. 7 is a schematic diagram of a structure of a computing device according to an embodiment of the present disclosure.

With reference to the foregoing embodiments of FIG. 1A to FIG. 6, the following describes a related device or a communications system to which the present disclosure is applicable. FIG. 7 is a schematic diagram of a structure of a computing device according to an embodiment of the present disclosure. A computing device 700 shown in FIG. 7 includes an obtaining module 702, a first processing module 704, and a control module 706.

The obtaining module 702 is configured to obtain first vehicle data and second vehicle data, where the first vehicle data is environment data that is within a first sensing scope and that is detected by a first group sensing apparatus at a first time point. The second vehicle data is environment data that is within a second sensing scope and that is detected by a second group sensing apparatus at the first time point.

The processing module 704 is configured to: process the first vehicle data using a first computing system to obtain first structured data; and process the second vehicle data using a second computing system to obtain second structured data. The first structured data is used to represent an environment that is of a vehicle at the first time point and that is detected by the first group sensing apparatus, and the second structured data is used to represent an environment that is of the vehicle at the first time point and that is detected by the second group sensing apparatus.

The control module 706 is configured to control safe driving of the vehicle based on the first structured data and the second structured data.

In actual application, the processing module 704 in this embodiment of the present disclosure may include the preprocessing module 1042 and the processing module 1043 in FIG. 1A or FIG. 1C. In other words, described functions of the processing module 704 in the present disclosure may be implemented by functional modules such as the preprocessing module 1042 and the processing module 1043 in FIG. 1A or FIG. 1C. The control module 706 in the present disclosure may include the instruction generation module 1044 in FIG. 1A or FIG. 1C and some or all functional modules in the microcontroller unit 106. The obtaining module 702 in the present disclosure may include the selection module 1045 and the like in FIG. 1A or FIG. 1C. This is not limited in the present disclosure.

In an optional embodiment, a difference between a data volume of the first vehicle data and a data volume of the second vehicle data is less than or equal to a first threshold.

In an optional embodiment, the control module 706 is configured to: obtain a first control instruction based on the first structured data and the second structured data using the first computing system, and control safe driving of the vehicle according to the first control instruction. During implementation, the control module 706 herein may include the instruction generation module 1044 included in the first computing system in FIG. 1A or FIG. 1C and the interconnection module 1063 in the microcontroller unit 106. For example, the computing device obtains the first control instruction based on the first structured data and the second structured data using the instruction generation module 1044, and controls safe driving of the vehicle according to the first control instruction using the interconnection module 1063 in the microcontroller unit 106.

In an optional embodiment, the control module 706 is further configured to determine that the first computing system is faulty, obtain, in response to the determining, a second control instruction based on the first structured data and the second structured data using the second computing system, and control safe driving of the vehicle according to the second control instruction. During implementation, the control module 706 in the present disclosure may include the monitoring module 1061, the arbitration module 1062, and the interconnection module 1063 in the microcontroller unit 106, and the instruction generation module 1044 in the computing system 104 in FIG. 1A or FIG. 1B and FIG. 1C. For example, the computing device obtains, by monitoring, a running status of the first computing system using the monitoring module 1061 in the microcontroller unit, and sends the running status to the arbitration module to arbitrate whether the first computing system is faulty. After the first computing system is faulty, the instruction generation module 1044 in the second computing system obtains the second control instruction based on the first structured data and the second structured data. Finally, the interconnection module 1063 may control safe driving of the vehicle according to the second control instruction.

In an optional embodiment, the obtaining module 702 is further configured to obtain third vehicle data and fourth vehicle data, where the third vehicle data is environment data that is within the first sensing scope and that is detected by the first group sensing apparatus at a second time point, and the second vehicle data is environment data that is within the second sensing scope and that is detected by the second group sensing apparatus at the second time point. The processing module 704 is configured to: determine that the first computing system is faulty; and perform, in response to the determining, dimension reduction processing on the third vehicle data and the fourth vehicle data using the second computing system. The processing module 704 is further configured to process the third vehicle data and fourth vehicle data after dimension reduction using the second computing system, to obtain third structured data and fourth structured data. The third structured data is used to represent an environment that is of the vehicle at the second time point and that is detected by the first group sensing apparatus, and the fourth structured data is used to represent an environment that is of the vehicle at the second time point and that is detected by the second group sensing apparatus. The control module 706 is further configured to control safe driving of the vehicle based on the third structured data and the fourth structured data.

For content that is not shown or not described in the present disclosure, refer to related descriptions in the foregoing embodiments. Details are not described herein again. The computing device shown in FIG. 7 may include more or fewer components in an actual application, and the figure is only an example and constitutes no limitation. Each module or each unit shown in FIG. 7 may be implemented using software or hardware. When each module or each unit is implemented using a software program, each module or each unit shown in the figure is a software module. When hardware is used, each module or each unit shown in the figure may be implemented using an application-specific integrated circuit (ASIC), or a programmable logic device (PLD). The PLD may be a complex programmable logical device (CPLD), a field programmable gate array (FPGA), a generic array logic (GAL), or any combination thereof. This is not limited in the present disclosure.

Implementation of this embodiment of the present disclosure can resolve problems in other approaches that requirements of mass production for low power consumption and high computing power cannot be met, and the like. Therefore, this reduces power consumption of data processing and improves efficiency of data processing.

Figure 8:
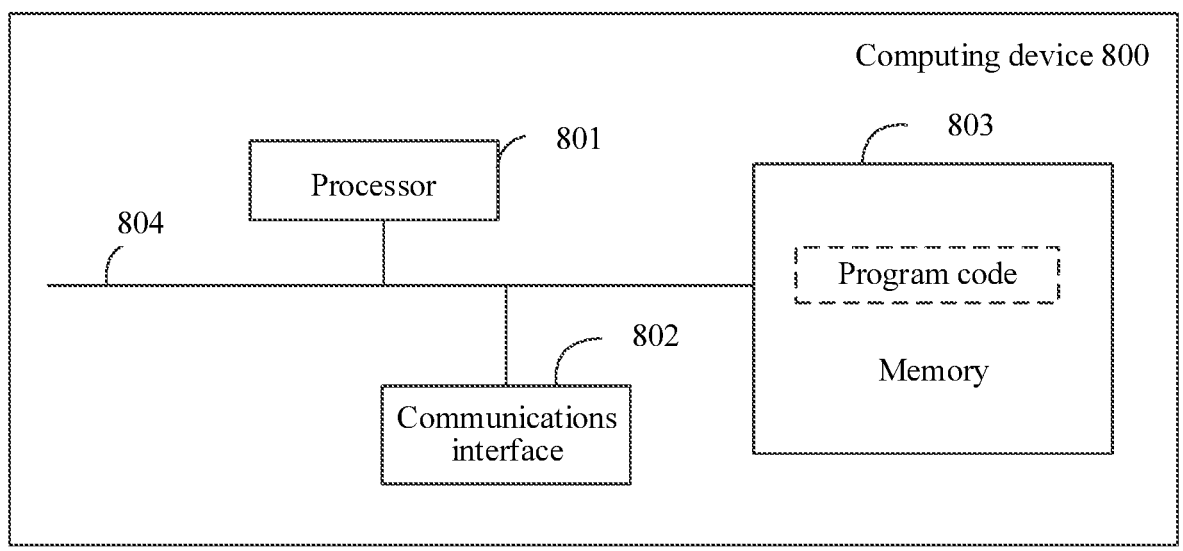
FIG. 8 is a schematic diagram of a structure of another computing device according to an embodiment of the present disclosure.

FIG. 8 is a schematic diagram of a structure of another computing device according to an embodiment of the present disclosure. A computing device 800 shown in FIG. 8 includes one or more processors 801, a communications interface 802, and a memory 803. The processor 801, the communications interface 802, and the memory 803 may be connected using a bus, or may implement communication in another manner such as wireless transmission. In this embodiment of the present disclosure, a connection using a bus 804 is used as an example. The memory 803 is configured to store an instruction, and the processor 801 is configured to execute the instruction stored in the memory 803. The memory 803 stores program code, and the processor 801 may invoke the program code stored in the memory 803 to perform all or some of the implementation steps provided in the method embodiment in FIG. 4 or FIG. 6. Details are not described herein again.

It should be understood that the processor 801 may be further configured to run related program code stored in the memory 803, to implement functions of the following functional module. For example, the functional module includes but is not limited to any one of or a combination of more of the following functions: for example, the obtaining module, the processing module, and the control module shown in FIG. 7, and all or some modules included in the computing system 104 and all or some of functional modules included in the microcontroller unit 106 shown in FIG. 1A or FIG. 1B and FIG. 1C. In other words, the memory 803 stores a set of program code, and the processor 801 may invoke the program code stored in the memory 803 to implement functions of all or some functional modules in the computing device shown in FIG. 1A or FIG. 1C, or implement content described in the method embodiment shown in FIG. 4 or FIG. 6. Details are not described herein.

It should be noted that FIG. 8 is only a possible implementation of this embodiment of the present disclosure. In actual application, a server may further include more or fewer components. This is not limited herein. For content that is not shown or not described in this embodiment of the present disclosure, refer to related descriptions in the foregoing embodiments of FIG. 1A to FIG. 7. Details are not described herein again.

Implementation of this embodiment of the present disclosure can resolve problems in other approaches that requirements of mass production for low power consumption and high computing power cannot be met, and the like. Therefore, this reduces power consumption of data processing and improves efficiency of data processing.

Figure 9:
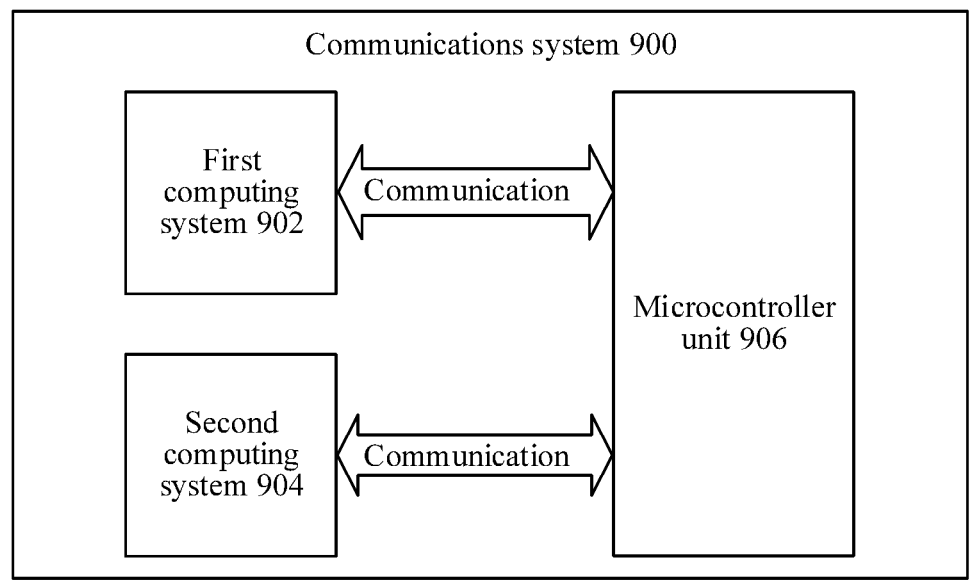
FIG. 9 is a schematic diagram of a structure of a communications system according to an embodiment of the present disclosure.

FIG. 9 is a schematic diagram of a structure of a communications system according to an embodiment of the present disclosure. A communications system 900 shown in FIG. 9 includes: a first computing system 902, a second computing system 904, and a microcontroller unit 906. The microcontroller unit 906 may separately communicate with the first computing system 902 and the second computing system 904 using a network. The first computing system 902 may also communicate with the second computing system 904 using a network. The first computing system 902 is configured to obtain first vehicle data, and process the first vehicle data, to obtain first structured data, where the first vehicle data is environment data that is within a first sensing scope and that is detected by a first group sensing apparatus at a first time point, and the first structured data is used to represent an environment that is of a vehicle at the first time point and that is detected by the first group sensing apparatus.

The second computing system 904 is configured to obtain second vehicle data and process the second vehicle data to obtain second structured data, where the second vehicle data is environment data that is within a second sensing scope and that is detected by a second group sensing apparatus at the first time point. The second structured data is used to represent an environment that is of the vehicle at the first time point and that is detected by the second group sensing apparatus.

The first computing system 902 is further configured to obtain a first control instruction based on the first structured data and the second structured data.

The microcontroller unit 906 is configured to control safe driving of the vehicle according to the first control instruction.

In this embodiment of the present disclosure, a quantity of the microcontroller unit 906 is not limited. When there is one microcontroller unit 906, the microcontroller unit 906 may communicate with the first computing system and the second computing system. Refer to related descriptions in the embodiment of FIG. 1A. When there are two microcontroller units 906, for example, the microcontroller units 906 include a first microcontroller unit and a second microcontroller unit, the first microcontroller may communicate with the first computing system, and the second microcontroller unit may communicate with the second computing system. For details, refer to related descriptions in the embodiment of FIG. 1B. Details are not described herein again.

In an optional embodiment, the microcontroller unit 906 is further configured to determine that the first computing system is faulty; the second computing system 904 is further configured to obtain, in response to the determining, a second control instruction based on the first structured data and the second structured data; and the microcontroller unit 906 is configured to control safe driving of the vehicle according to the second control instruction. The communications system 900 determines, using the microcontroller unit 906, whether a computing system is faulty. For example, after the first computing system obtains the first structured data, the first computing system is faulty. Then, the communications system may continue to invoke the second computing system 904 to obtain the second control instruction based on the first structured data and the second structured data, and further controls safe driving of the vehicle according to the second control instruction using the microcontroller unit 906.

In an optional embodiment, the microcontroller unit 906 is further configured to determine that the first computing system is faulty. The second computing system 904 is further configured to obtain, in response to the determining, third vehicle data and fourth vehicle data, and perform dimension reduction processing on the third vehicle data and the fourth vehicle data, where the third vehicle data is environment data that is within the first sensing scope and that is detected by the first group sensing apparatus at a second time point. The fourth vehicle data is environment data that is within the second sensing scope and that is detected by the second group sensing apparatus at the second time point. The second computing system 904 is further configured to process the third vehicle data after dimension reduction to obtain third structured data, where the third structured data is used to represent an environment that is of the vehicle at the second time point and that is detected by the first group sensing apparatus. The second computing system 904 is further configured to process the fourth vehicle data after dimension reduction, to obtain fourth structured data, where the fourth structured data is used to represent an environment that is of the vehicle at the second time point and that is detected by the second group sensing apparatus. The second computing system 904 is further configured to obtain a third control instruction based on the third structured data and the fourth structured data, and the microcontroller unit 906 is further configured to control safe driving of the vehicle according to the third control instruction.

For details about content that is not shown or not described in this embodiment of the present disclosure, refer to related descriptions in the foregoing embodiments of FIG. 1A to FIG. 6. Details are not described herein again. Implementation of this embodiment of the present disclosure can resolve problems in other approaches that requirements of mass production for low power consumption and high computing power cannot be met, and the like. Therefore, this reduces power consumption of data processing and improves efficiency of data processing.

An embodiment of the present disclosure further provides a computer non-transitory storage medium. The computer non-transitory storage medium stores an instruction, and when the instruction is run on a processor, the method procedure shown in FIG. 4 or FIG. 6 is implemented.

An embodiment of the present disclosure further provides a computer program product. When the computer program product is run on a processor, the method procedure shown in FIG. 4 or FIG. 6 is implemented.

Method or algorithm steps described in combination with the content disclosed in this embodiment of the present disclosure may be implemented by hardware, or may be implemented by a processor by executing a software instruction. The software instruction may include a corresponding software module. The software module may be stored in a random access memory (RAM), a flash memory, a read-only memory (ROM), an erasable programmable ROM (EPROM), an electrically EPROM (EEPROM), a register, a hard disk, a removable hard disk, a compact disc read-only memory (CD-ROM), or any other form of storage medium well-known in the art. For example, a storage medium is coupled to a processor, such that the processor can read information from the storage medium or write information into the storage medium. Certainly, the storage medium may be a component of the processor. The processor and the storage medium may be located in an ASIC. In addition, the ASIC may be located in a computing device. Certainly, the processor and the storage medium may alternatively exist in the computing device as discrete components.

The foregoing descriptions are only example implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A vehicle control method applied to a computing device comprising a first computing system and a second computing system, wherein the vehicle control method comprises:
obtaining first vehicle data and second vehicle data, wherein the first vehicle data is first environment data that is within a first sensing scope and that is from a first group sensing apparatus at a first time point, and wherein the second vehicle data is second environment data that is within a second sensing scope and that is from a second group sensing apparatus at the first time point;
processing the first vehicle data using the first computing system to obtain first structured data, wherein the first structured data represents a first environment of a vehicle at the first time point;
processing the second vehicle data using the second computing system to obtain second structured data, wherein the second structured data represents a second environment of the vehicle at the first time point;
obtaining a first control instruction based on the first structured data and the second structured data; and
controlling safe driving of the vehicle based on the first control instruction.

2. The vehicle control method according to claim 1, wherein a difference between a first data volume of the first vehicle data and a second data volume of the second vehicle data is less than or equal to a first threshold.

3. The vehicle control method according to claim 1, wherein obtaining the first control instruction based on the first structured data and the second structured data comprises obtaining the first control instruction using the first computing system.

4. The vehicle control method according to claim 1, wherein obtaining the first control instruction based on the first structured data and the second structured data further comprises obtaining the first control instruction using the second computing system when the first computing system is faulty.

5. The vehicle control method according to claim 1, further comprising obtaining third vehicle data and fourth vehicle data, wherein the third vehicle data is third environment data that is within the first sensing scope and that is from the first group sensing apparatus at a second time point, and wherein the fourth vehicle data is fourth environment data that is within the second sensing scope and that is from the second group sensing apparatus at the second time point.

6. The vehicle control method according to claim 5, further comprising performing, when the first computing system is faulty, dimension reduction processing on the third vehicle data and the fourth vehicle data using the second computing system.

7. The vehicle control method according to claim 6, further comprising:
processing the third vehicle data after the dimension reduction processing to obtain third structured data using the second computing system, wherein the third structured data represents a third environment of the vehicle at the second time point;
processing the fourth vehicle data after the dimension reduction processing to obtain fourth structured data using the second computing system, wherein the fourth structured data represents a fourth environment of the vehicle at the second time point;
obtaining a second control instruction based on the third structured data and the four structured data using the second computing system; and
controlling safe driving of the vehicle based on the second control instruction.

8. A computing device comprising:
a processor configured to:
obtain first vehicle data and second vehicle data, wherein the first vehicle data is first environment data that is within a first sensing scope and that is from a first group sensing apparatus at a first time point, and wherein the second vehicle data is second environment data that is within a second sensing scope and that is from a second group sensing apparatus at the first time point;
process the first vehicle data using a first computing system to obtain first structured data, wherein the first structured data represents a first environment of a vehicle at the first time point; and
process the second vehicle data using a second computing system to obtain second structured data, wherein the second structured data represents a second environment of the vehicle at the first time point; and
a controller coupled to the processor and configured to:
obtain a first control instruction based on the first structured data and the second structured data; and
control safe driving of the vehicle based on the first control instruction.

9. The computing device according to claim 8, wherein a difference between a data volume of the first vehicle data and a data volume of the second vehicle data is less than or equal to a first threshold.

10. The computing device according to claim 8, wherein the controller is further configured to obtain the first control instruction based on the first structured data and the second structured data using the first computing system.

11. The computing device according to claim 8, wherein the controller is further configured to:
determine that the first computing system is faulty; and
obtain, in response to determining that the first computing system is faulty, the first control instruction based on the first structured data and the second structured data using the second computing system.

12. The computing device according to claim 8, wherein the processor is further configured to obtain third vehicle data and fourth vehicle data, wherein the third vehicle data is third environment data that is within the first sensing scope and that is from the first group sensing apparatus at a second time point, and wherein the fourth vehicle data is fourth environment data that is within the second sensing scope and that is from the second group sensing apparatus at the second time point.

13. The computing device according to claim 12, wherein the processor is further configured to:
determine that the first computing system is faulty; and
perform, in response to determining that the first computing system is faulty, dimension reduction processing on the third vehicle data and the fourth vehicle data using the second computing system.

14. The computing device according to claim 13, wherein the processor is further configured to:
obtain third structured data by processing the third vehicle data after the dimension reduction processing using the second computing system; and
obtain fourth structured data by processing the fourth vehicle data after dimension reduction using the second computing system, wherein the third structured data represents a third environment of the vehicle at the second time point, and wherein the fourth structured data represents a fourth environment of the vehicle at the second time point;
wherein the controller is further configured to:
obtain a second control instruction based on the third structured data and the fourth structured data; and
control safe driving of the vehicle based on the second control instruction.

15. A communications system comprising:
a first computing system configured to obtain first vehicle data and process the first vehicle data to obtain first structured data, wherein the first vehicle data is first environment data that is within a first sensing scope and that is from a first group sensing apparatus at a first time point, and wherein the first structured data represents a first environment of a vehicle at the first time point;
a second computing system configured to obtain second vehicle data and process the second vehicle data to obtain second structured data, wherein the second vehicle data is second environment data that is within a second sensing scope and that is detected by a second group sensing apparatus at the first time point, and wherein the second structured data represents a second environment that is of the vehicle at the first time point and that is detected by the second group sensing apparatus;
the first computing system is further configured to obtain a first control instruction based on the first structured data and the second structured data; and
a microcontroller coupled to the first computing system and the second computing system and configured to control safe driving of the vehicle according to the first control instruction.

16. The communications system according to claim 15, wherein a difference between a data volume of the first vehicle data and a data volume of the second vehicle data is less than or equal to a first threshold.

17. The communications system according to claim 15, wherein the microcontroller is further configured to determine that the first computing system is faulty, wherein the second computing system is further configured to obtain, in response to determining that the first computing system is faulty, a second control instruction based on the first structured data and the second structured data, and wherein the microcontroller is configured to control safe driving of the vehicle according to the second control instruction.

18. The communications system according to claim 15, wherein the microcontroller is further configured to determine that the first computing system is faulty;
wherein the second computing system is further configured to:
obtain, in response to the determining, third vehicle data and fourth vehicle data; and
perform dimension reduction processing on the third vehicle data and the fourth vehicle data.

19. The communications system according to claim 18, wherein the third vehicle data is third environment data that is within the first sensing scope and that is detected by the first group sensing apparatus at a second time point, and wherein the fourth vehicle data is fourth environment data that is within the second sensing scope and that is detected by the second group sensing apparatus at the second time point.

20. The communications system according to claim 19, wherein the second computing system is further configured to:
process the third vehicle data after the dimension reduction processing to obtain third structured data, wherein the third structured data represent a third environment that is of the vehicle at the second time point and that is detected by the first group sensing apparatus;
process the fourth vehicle data after the dimension reduction processing to obtain fourth structured data, wherein the fourth structured data represents a fourth environment that is of the vehicle at the second time point and that is detected by the second group sensing apparatus; and
obtain a third control instruction based on the third structured data and the fourth structured data, and
wherein the microcontroller is further configured to control safe driving of the vehicle according to the third control instruction.

* * * * *